United States Patent
Norieda

(10) Patent No.: US 9,049,277 B2
(45) Date of Patent: Jun. 2, 2015

(54) EVENT NOTIFICATION DEVICE, EVENT NOTIFICATION METHOD, PROGRAM, AND RECORDING MEDIUM

(75) Inventor: Shin Norieda, Minato-ku (JP)

(73) Assignee: NEC CORPORATION, Tokyo (JP)

(*) Notice: Subject to any disclaimer, the term of this patent is extended or adjusted under 35 U.S.C. 154(b) by 644 days.

(21) Appl. No.: 13/382,842

(22) PCT Filed: May 19, 2010

(86) PCT No.: PCT/JP2010/058436
§ 371 (c)(1),
(2), (4) Date: Jan. 6, 2012

(87) PCT Pub. No.: WO2011/004652
PCT Pub. Date: Jan. 13, 2011

(65) Prior Publication Data
US 2012/0105192 A1 May 3, 2012

(30) Foreign Application Priority Data
Jul. 9, 2009 (JP) ................... 2009-163199

(51) Int. Cl.
G08B 23/00 (2006.01)
H04M 1/02 (2006.01)
(Continued)

(52) U.S. Cl.
CPC .......... H04M 1/0202 (2013.01); H04M 19/042 (2013.01); A44C 5/00 (2013.01);
(Continued)

(58) Field of Classification Search
CPC ................ H04M 19/00; H04M 19/02; H04M 19/04–19/048; H04M 1/72558; H04M 1/72561; A44C 5/00–5/246
USPC ................ 340/500, 691.1, 691.6, 691.7, 692, 340/693.5, 1.1, 6.1, 407.1, 815.4, 384.1, 340/384.5, 384.7–384.73, 392.3; 455/73, 455/550.1, 567, 557, 566; 379/82, 179, 379/373.01–376.02
See application file for complete search history.

(56) References Cited

U.S. PATENT DOCUMENTS 4,234,944 A * 11/1980 Komaki et al. ................. 368/72
5,960,367 A * 9/1999 Kita .............................. 455/567
(Continued)

FOREIGN PATENT DOCUMENTS

JP 5-83332 A 4/1993
JP 11-46230 A 2/1999
(Continued)

OTHER PUBLICATIONS

Tadasu Oyama, et al., "Shinpen Kankaku • Chikaku Shinrigaku Handbook (New Edition Sensation/Perception Psychology Handbook)", Seishiti-shobo, 1994, p. 1021.

Primary Examiner — Steven Lim
Assistant Examiner — Ryan Sherwin
(74) Attorney, Agent, or Firm — Sughrue Mion, PLLC

(57) ABSTRACT

Provided is an event notification device capable of notifying an event with excellent immediacy without giving a shock or a sense of discomfort to a user. The event notification device 10 of the present invention includes: a notification event detection unit 11 that detects an event to be notified to a user and outputs notification data a; a stimulus control unit 12 that outputs stimulus presentation data b for providing control for presenting a stimulus to the user until the stimulus control unit receives the notification data a, and outputs stimulus removal data c for providing control for removing the presented stimulus after the stimulus control unit receives the notification data a; a stimulus presentation unit 13 that presents the stimulus upon receipt of the stimulus presentation data b and removes the presented stimulus upon receipt of the stimulus removal data c; and a transmission unit 14 that transmits presentation and removal of the stimulus to the user.

29 Claims, 17 Drawing Sheets

(51) Int. Cl.
*H04M 19/04* (2006.01)
*A44C 5/00* (2006.01)
*H04M 1/725* (2006.01)

(52) U.S. Cl.
CPC ......... *H04M 19/045* (2013.01); *H04M 19/048* (2013.01); *H04M 19/047* (2013.01); *H04M 1/72558* (2013.01); *H04M 19/04* (2013.01)

(56) References Cited

U.S. PATENT DOCUMENTS

| | | | | |
|---|---|---|---|---|
| 5,987,106 | A * | 11/1999 | Kitamura | 379/110.01 |
| 6,006,115 | A * | 12/1999 | Wingate | 455/575.2 |
| 6,359,550 | B1 | 3/2002 | Brisebois et al. | |
| 6,947,728 | B2 * | 9/2005 | Tagawa et al. | 455/414.1 |
| 7,123,714 | B2 * | 10/2006 | Boillot et al. | 379/406.04 |
| 7,564,979 | B2 * | 7/2009 | Swartz | 381/60 |
| 2005/0149654 | A1 * | 7/2005 | Holloway et al. | 710/100 |
| 2005/0181826 | A1 * | 8/2005 | Yueh | 455/556.2 |
| 2005/0219041 | A1 * | 10/2005 | Dobler et al. | 340/425.5 |
| 2007/0057775 | A1 * | 3/2007 | O'Reilly et al. | 340/309 |
| 2007/0265038 | A1 * | 11/2007 | Kim | 455/567 |
| 2012/0140974 | A1 * | 6/2012 | Danielson et al. | 381/379 |

FOREIGN PATENT DOCUMENTS

| | | |
|---|---|---|
| JP | 11-215213 A | 8/1999 |
| JP | 2002-305564 A | 10/2002 |
| JP | 2003-8700 A | 1/2003 |
| JP | 2004-146934 A | 5/2004 |
| JP | 2005-130106 A | 5/2005 |

* cited by examiner

EVENT NOTIFICATION DEVICE, EVENT NOTIFICATION METHOD, PROGRAM, AND RECORDING MEDIUM

CROSS REFERENCE TO RELATED APPLICATIONS

This application is a National Stage of International Application No. PCT/JP2010/058436, filed on May 19, 2010, which claims priority from Japanese Patent Application No. 2009-163199, filed on Jul. 9, 2009, the contents of all of which are incorporated herein by reference in their entirety.

TECHNICAL FIELD

The present invention relates to an event notification device, an event notification method, a program, and a recording medium.

BACKGROUND ART

At present, notification of an event, such as an incoming call, to a user in a mobile phone generally is carried out by way of, for example: presentation by a sound such as a ring alert or a ring melody; presentation by vibration such as a vibration alert; or presentation by light such as lighting of an LED lamp. Event notification by the presentation of a sound or vibration as described above has a problem in that sudden generation of a sound or vibration may give a shock or a sense of discomfort to a user.

In order to solve this problem, the following methods have been proposed: a method in which a sound notifying an incoming call is increased gradually with time (see Patent Document 1, for example); a method in which vibration notifying an incoming call is increased gradually (see Patent Document 2, for example); and methods in which the above-described methods are used in combination (see Patent Documents 3 and 4, for example). Also, there has been proposed a method in which a device for notifying an event is placed on a wrist or the like of a user, and a low-frequency electrical stimulus is given to a human body (user) by this device (see Patent Document 5). The above-described method in which a sound notifying an incoming call is increased gradually with time is referred to as "Ramped Ringer".

CITATION LIST

Patent Document(s)

Patent Document 1: JP 5(1993)-83332 A
Patent Document 2: JP 2002-305564 A
Patent Document 3: JP 2004-146934 A
Patent Document 4: JP 2005-130106 A
Patent Document 5: JP 11(1999)-215213 A

BRIEF SUMMARY OF THE INVENTION

Problem to be Solved by the Invention

However, the methods described in Patent Documents 1 to 4 have a problem in that, when a sound or vibration notifying an incoming call is initially set small so as to avoid giving a shock or a sense of discomfort to a user, it takes time for the user to notice the notified event, resulting in lack of immediacy. Furthermore, according to the method described in Patent Document 5, in order to supply an electrical stimulus safely to a user, it is necessary to start the supply with a weak electrical stimulus. Thus, similarly to the above-described methods, it also suffers a problem of lack of immediacy.

An object of the present invention is to provide an event notification device, an event notification method, a program, and a recording medium, each capable of notifying an event with excellent immediacy without giving a shock or a sense of discomfort to a user.

Means for Solving Problem

In order to achieve the above object, the present invention provides an event notification device including:
a notification event detection unit that detects an event to be notified to a user and outputs notification data;
a stimulus control unit that outputs stimulus presentation data for providing control for presenting a stimulus to the user until the stimulus control unit receives the notification data, and outputs stimulus removal data for providing control for removing the presented stimulus after the stimulus control unit receives the notification data;
a stimulus presentation unit that presents the stimulus upon receipt of the stimulus presentation data and removes the presented stimulus upon receipt of the stimulus removal data; and
a transmission unit that transmits presentation and removal of the stimulus to the user.

The present invention also provides an event notification method including:
an event notification preparation step of preparing for event notification by presenting a stimulus to a user until an event to be notified to the user occurs; and
an event notification step of notifying the event to the user by removing the stimulus being presented to the user when the event occurs.

The present invention also provides a program that causes a computer to execute the event notification method according to the present invention.

The present invention also provides a recording medium storing the program according to the present invention.

Effects of the Invention

According to the present invention, it is possible to provide an event notification device, an event notification method, a program, and a recording medium, each capable of notifying an event with excellent immediacy without giving a shock or a sense of discomfort to a user.

MODE FOR CARRYING OUT THE INVENTION

In the following, the event notification device, the event notification method, the program, and the recording medium according to the present invention will be described in detail with reference to illustrative examples. It is to be noted, however, that the present invention is by no means limited to the following embodiments.

First Embodiment

Figure 1:
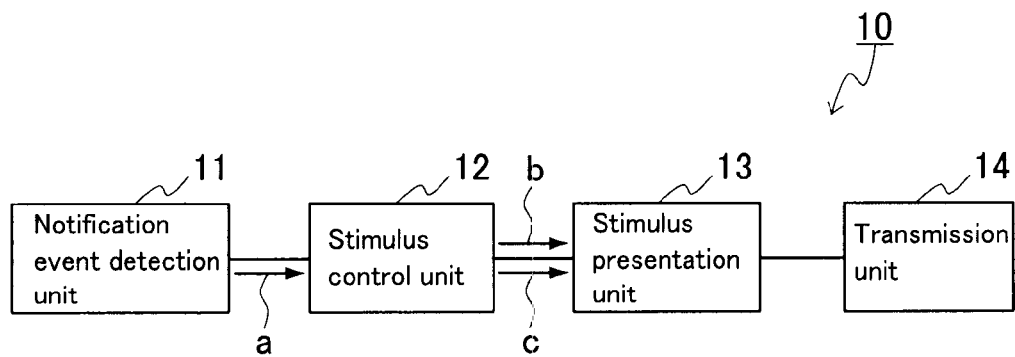
FIG. 1 is a block diagram showing an example of the configuration of an event notification device according to the first embodiment of the present invention.

FIG. 1 shows an example of the configuration of an event notification device according to the present embodiment. As shown in FIG. 1, this event notification device 10 includes: a notification event detection unit 11; a stimulus control unit 12; a stimulus presentation unit 13; and a transmission unit 14. The notification event detection unit 11 is electrically connected to the stimulus control unit 12. The stimulus control unit 12 is electrically connected to the stimulus presentation unit 13. The stimulus presentation unit 13 is electrically connected to the transmission unit 14.

When the event notification device according to the present embodiment is incorporated in electronic equipment such as a mobile phone, a portable notebook computer, a portable game machine, or a portable music player, for example, the notification event detection unit may include a transmission and reception section for transmitting and receiving an input/output signal. Furthermore, when the event notification device of the present embodiment is provided independently from the above-described electronic equipment and the like, the notification event detection unit may include an antenna and a transmission and reception section for transmitting and receiving a signal that is inputted/outputted through the antenna.

The stimulus control unit includes a central processing unit (CPU), for example. The stimulus control performed by the stimulus control unit will be described below. When the event notification device of the present embodiment includes, for example, an operation section, a display section, a memory, and the like, the stimulus control unit may be electrically connected to them, for example.

The stimulus presentation unit is not particularly limited, and can be selected as appropriate depending on the kind of a stimulus to be presented to a user. The stimulus is not particularly limited, and examples thereof include a pressure, vibration, and a sound. When the stimulus is a pressure, vibration, a sound, or the like, the stimulus presentation unit may be an actuator or the like, for example. Although the stimulus presentation unit is electrically connected to the transmission unit in the event notification device according to the present embodiment, the present invention is not limited to this example. For example, the stimulus presentation unit may be mechanically connected to the transmission unit. Examples of the actuator include: various motors that utilize an electromagnetic force, an electrostatic force, or a friction force; converters that utilize a piezoelectric effect or a magnetostriction effect; oil-hydraulic motors; and cylinders.

The transmission unit is not particularly limited, and can be selected as appropriate depending on the kind of a stimulus to be presented to a user. When the stimulus is vibration, the transmission unit may be a vibrator, for example. When the stimulus is a sound, the transmission unit may be a speaker, for example.

An event to be notified to a user by the event notification device of the present embodiment is not particularly limited. Examples of the event include, in electronic equipment such as a mobile phone, a portable notebook computer, a portable game machine, or a portable music player: arrival of a preset time; a call; receipt of an e-mail; establishment of communication such as the Web; interruption of the communication; completion of download; completion of upload; completion of transmission or reception of data; occurrence of an event and a response to an operation of the equipment in a game; occurrence of an event and a response to an operation of the equipment in an application; and a content or a response to a user generated in a terminal.

Figure 2:
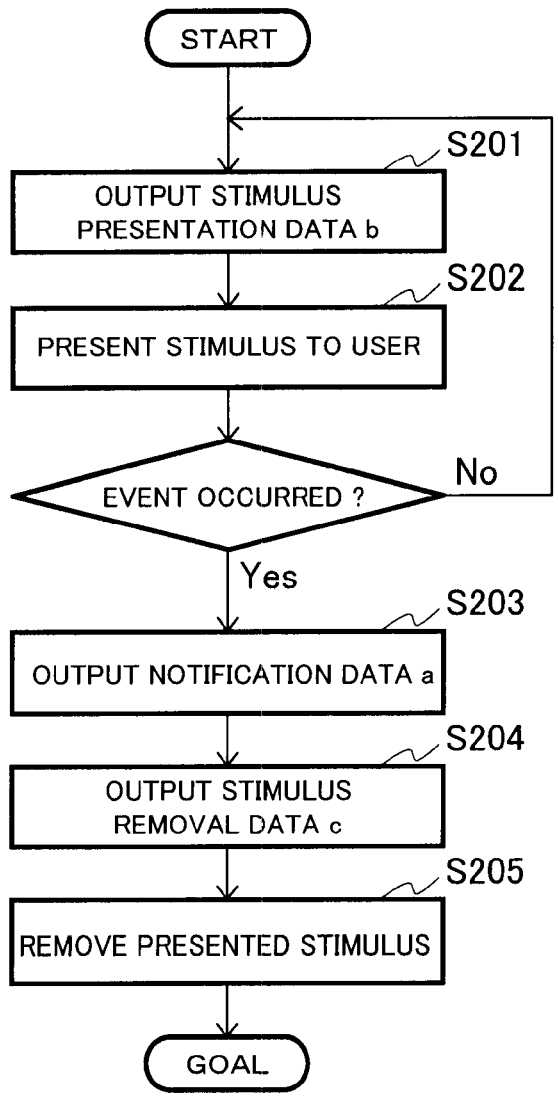
FIG. 2 is a flowchart illustrating an example of an event notification method carried out using the event notification device shown in FIG. 1.

Next, with reference to FIGS. 1 and 2, an event notification method carried out using the event notification device of the present embodiment will be described. Parts in common between FIGS. 1 and 2 are given the same reference numerals. The event notification method carried out using the event notification device of the present embodiment includes: a stimulus presentation data outputting step; a stimulus presenting step; a presented stimulus transmitting step; a notification data outputting step; a stimulus removal data outputting step; a stimulus removing step; and a stimulus removal transmitting step. The stimulus presentation data outputting step, the stimulus presenting step, and the presented stimulus transmitting step correspond to the "event notification preparation step". The stimulus removal data outputting step, the stimulus removing step, and the stimulus removal transmitting step correspond to the "event notification step". The notification data outputting step corresponds to an "event detection step of detecting occurrence of the event". The event notification method of the present invention may be carried out without using the event notification device of the present invention. However, it is preferable that the event notification method of the present invention is carried out using the event notification device of the present invention, for example, as in the present embodiment and in the respective embodiments to be described below.

(Stimulus Presentation Data Outputting Step, Stimulus Presenting Step, and Presented Stimulus Transmitting Step)

In the event notification device according to the present embodiment, in the state where no event occurs, first, the stimulus control unit 12 outputs to the stimulus presentation unit 13 stimulus presentation data b for providing control for presenting a stimulus to a user as an electrical signal (the stimulus presentation data outputting step, Step S201 in FIG. 2, the figure number is omitted hereinafter). The stimulus presentation unit 13 receives the stimulus presentation data b, generates a stimulus, and presents the thus-generated stimulus to the transmission unit 14 (the stimulus presenting step). The transmission unit 14 transmits and presents the presented stimulus to the user (the presented stimulus transmitting step). In FIG. 2, the stimulus presenting step and the presented stimulus transmitting step are altogether indicated as Step S202. When no event occurs (No), Steps S201 and S202 are repeated, and this state is maintained.

(Notification Data Outputting Step)

As described above, when an event occurs with the stimulus being presented to the user (Yes), the notification event detection unit 11 detects this event. If the notification event detection unit 11 detects the event, it outputs notification data a to the stimulus control unit 12 as an electrical signal (Step S203).

(Stimulus Removal Data Outputting Step, Stimulus Removing Step, and Stimulus Removal Transmitting Step)

The stimulus control unit 12 receives the notification data a, and outputs, as an electrical signal, stimulus removal data c for providing control for removing the stimulus being presented to the user to the stimulus presentation unit 13 (the stimulus removal data outputting step, Step S204). The stimulus presentation unit 13 receives the stimulus removal data c, and removes the presented stimulus (the stimulus removing step). The transmission unit 14 transmits the removal of the stimulus to the user, and removes the stimulus being presented to the user (the stimulus removal transmitting step). In FIG. 2, the stimulus removing step and the stimulus removal transmitting step are altogether indicated as Step S205.

In the event notification device of the present embodiment, in the manner described above, a stimulus is presented to a user until an event occurs, and the presented stimulus is removed when the event occurs, thereby notifying the event to the user. Thus, according to the event notification device of the present embodiment, there is no feat that a shock or a sense of discomfort might be given to a user by sudden generation of vibration or a sound at the time of event notification as in conventional art. Furthermore, because the event is notified by removing the stimulus, the user can notice the occurrence of the event immediately after the start of the notification. As a result, the event notification device of the present embodiment can achieve event notification with excellent immediacy. It is speculated that the event notification device of the present embodiment exhibits these effects utilizing a mechanism such that, when a stimulus such as a force, vibration, or a sound to which a person normally does not pay attention is suddenly interrupted, the person first realizes that he has been subjected to the stimulus, for example. It is to be noted, however, that the present invention is by no means limited or restricted by this speculation.

Furthermore, according to the event notification device of the present embodiment, since an event is notified by removing the stimulus as described above, not only the user is prevented from feeling a sense of discomfort, but also the user can feel a sense of release, for example. Furthermore, in the event notification device of the present embodiment, a sound, vibration, or the like is not increased at the time of event notification as in conventional art. Thus, there is no fear that a shock or a sense of discomfort might be given also to people around the user, for example.

Figure 3:
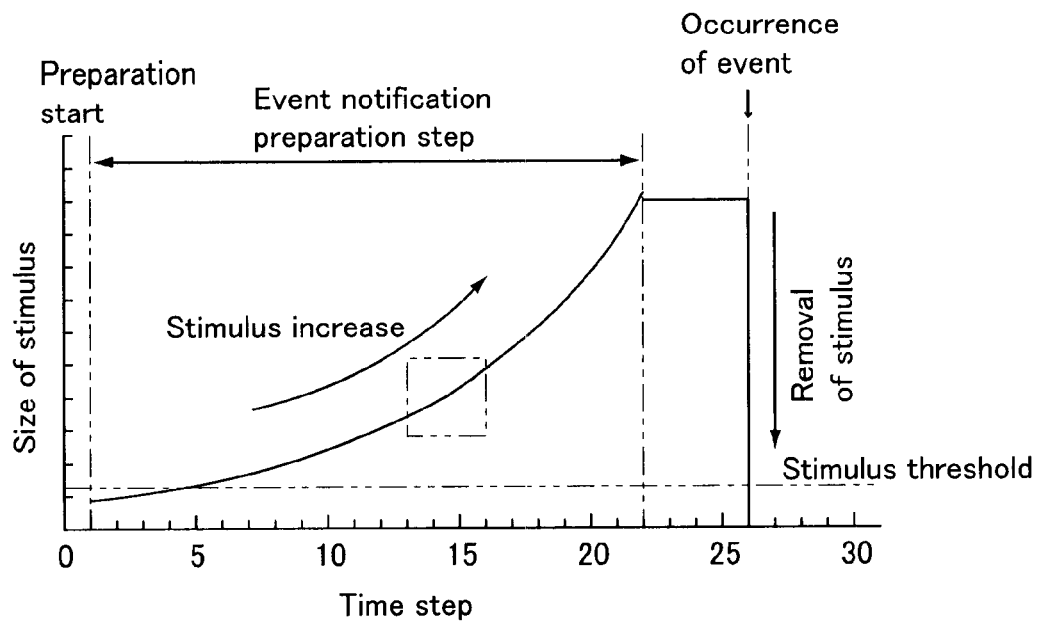
FIG. 3 is a graph showing an example of the relationship between time steps and the size of a stimulus in the event notification method of FIG. 2.

In the event notification preparation step, for example, the stimulus may be presented to the user while being increased gradually. An example thereof is shown in FIG. 3. This example is directed to the case where a stimulus is a pressure. FIG. 3 is a graph showing the relationship between time steps (the horizontal axis: 30 steps) and the size of a stimulus (the vertical axis). As shown in FIG. 3, the time steps 1 to 22 correspond to the event notification preparation step, and the time step 26 corresponds to the event notification step. As described above, by presenting the stimulus to a user while increasing the stimulus gradually in the event notification preparation step, it is possible to present the stimulus while more effectively preventing the user from noticing the stimulus.

In the time step 1, the size of the stimulus to be presented to the user initially at the time of starting the preparation preferably is smaller than the stimulus threshold, which is a minimum value that allows the stimulus to be sensed by the user, as shown in FIG. 3. With this configuration, it is possible to present the stimulus in the event notification preparation step while still more effectively preventing the user from noticing the stimulus. The stimulus threshold is, for example, about 1.3 [mN], which corresponds to the stimulus threshold of Merkel cells (SAI) as human sensory receptors mainly sensing a pressure.

Figure 4:
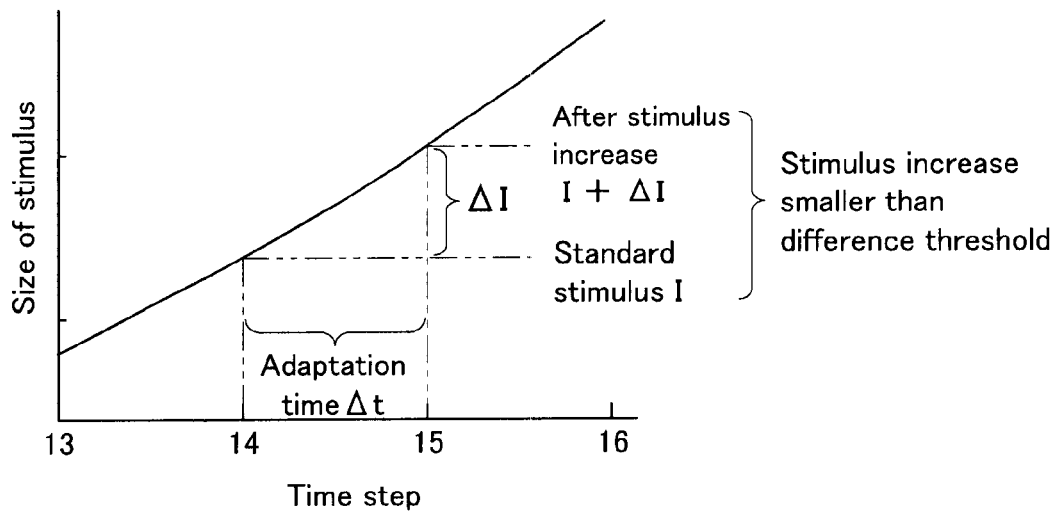
FIG. 4 is a graph obtained by enlarging a part of the graph of FIG. 3.

In the event notification preparation step, for example, the stimulus may be presented to the user while being increased gradually in an amount smaller than the difference threshold, which is a minimum stimulus difference noticeable by the user as change in stimulus. The difference threshold will be described with reference to FIG. 4. FIG. 4 is a graph obtained by enlarging a portion extending from the time steps 13 to 16 in FIG. 3. As shown in FIG. 4, the amount of the pressure stimulus used as a standard is represented by "I", and the amount of the pressure stimulus to be increased is represented by "ΔI". I and ΔI satisfy the relationship represented by the following formula (I). "C" in this formula is referred to as a Weber fraction (constant). The above-described Weber fraction for the pressure stimulus is from 0.14 to 0.2, for example.

$$C = \Delta I / I \tag{I}$$

The recurrence formula represented by the following formula (II) is established, where the amount of the stimulus in each time step is $I_k$.

$$I_k = I_{k-1} + \Delta I_k = I_{k-1}(1+C)$$

$$k = 0, 1, 2 \ldots, 22 \tag{II}$$

This increase in the amount of the stimulus in each time step corresponds to the increase in stimulus in an amount smaller than the difference threshold.

Figure 5:
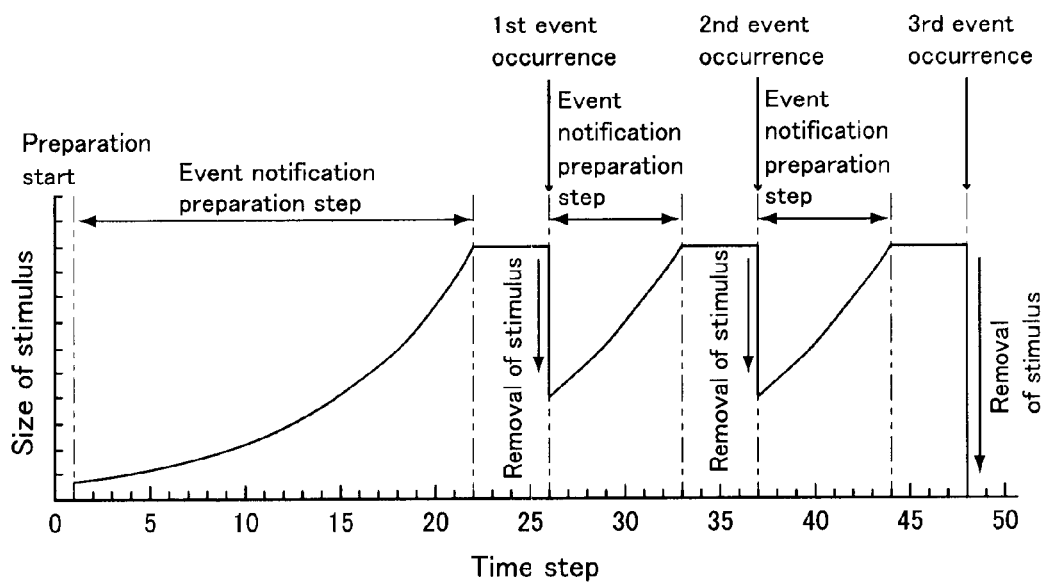
FIG. 5 is a graph showing another example of the relationship between time steps and the size of a stimulus in the event notification method of FIG. 2.

In the event notification step, the stimulus being presented to the user may be removed only partially, for example. An example thereof is shown in FIG. 5. This example is directed to the case where the stimulus is a pressure. FIG. 5 is a graph showing the relationship between time steps (the horizontal axis: 50 steps) and the size of a stimulus (the vertical axis). As shown in FIG. 5, the time steps 1 to 22 correspond to a first event notification preparation step; the time steps 26 to 33 correspond to a second event notification preparation step; and the time steps 37 to 44 correspond to a third event notification preparation step. Furthermore, the time step 26 corresponds to a first event notification step; the time step 37 corresponds to a second event notification step; and the time step 48 corresponds to a third event notification step. In the first and second event notification steps, only about a half of the stimulus being presented to the user is removed. With this configuration, it is possible to shorten the time interval between the event notification preparation steps. Thus, it becomes possible to address the case where events occur successively without any time interval, for example.

By setting the amount of the stimulus to be removed so as to be equal to or greater than the above-described difference threshold (the Weber fraction), it is possible to further shorten the time interval in between the event notification preparation steps.

In order to present a stimulus to a user in the above-described manner, the stimulus presentation data may be configured so that it can present a stimulus in the above-described manner in the event notification device of the present embodiment, for example. Furthermore, in order to set the initial value at the time of starting the stimulus presentation to be smaller than the stimulus threshold as described above, the stimulus presentation data may be configured so that it can present a stimulus with the above-described initial value in the event notification device of the present embodiment, for example. Still further, in order to remove a stimulus being presented to a user in the above-described manner, the stimulus removal data may be configured so that it can remove the stimulus in the above-described manner in the event notification device of the present embodiment, for example.

Second Embodiment

Figure 6:
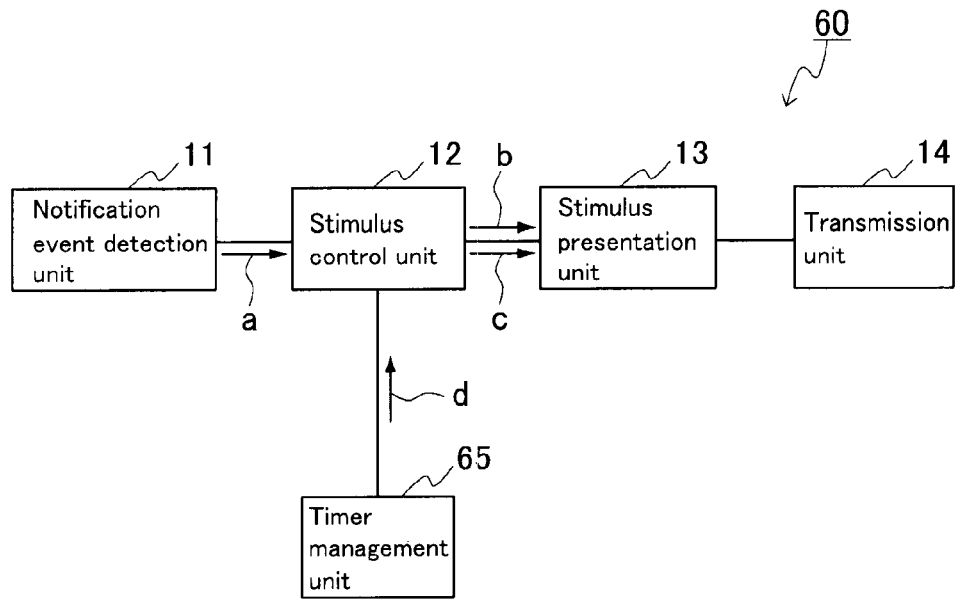
FIG. 6 is a block diagram showing an example of the configuration of an event notification device according to the second embodiment of the present invention.

FIG. 6 shows an example of the configuration of an event notification device according to the present embodiment. In FIG. 6, parts that are the same as those in FIG. 1 are given the same reference numerals. As shown in FIG. 6, this event notification device 60 has the same configuration as the event notification device of the first embodiment, except that it further includes a timer management unit 65. That is, this event notification device 60 includes a notification event detection unit 11, a stimulus control unit 12, a stimulus presentation unit 13, a transmission unit 14, and the timer management unit 65. The timer management unit 65 is electrically connected to the stimulus control unit 12.

The timer management unit includes a central processing unit (CPU) that can construct and output interval data to be described below, for example.

Figure 7:
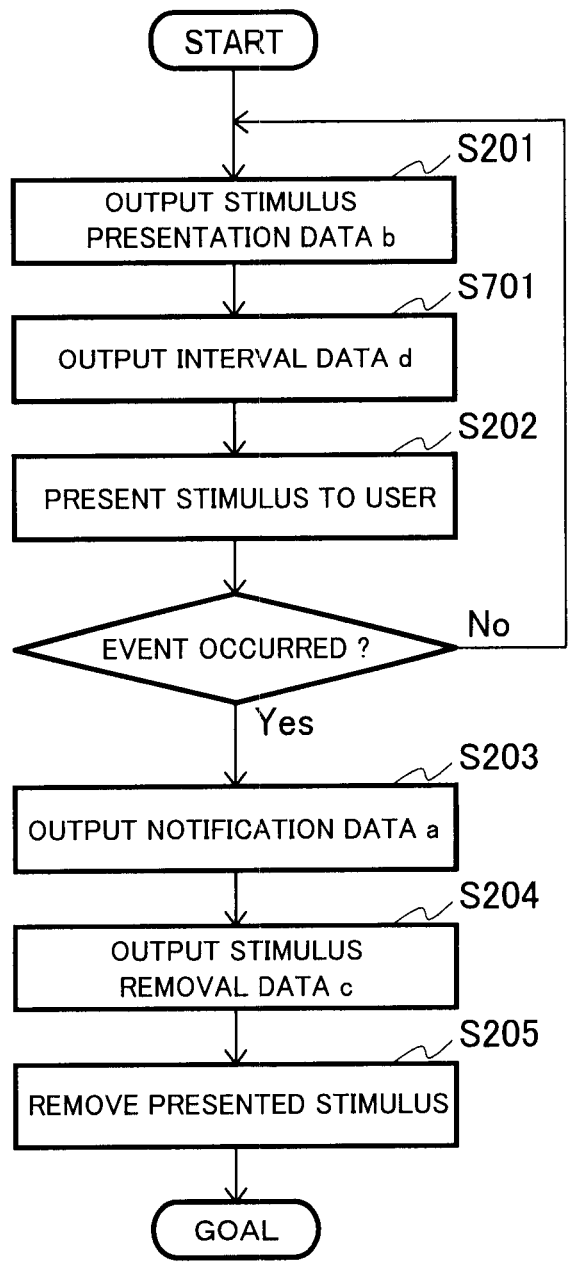
FIG. 7 is a flowchart illustrating an example of an event notification method carried out using the event notification device shown in FIG. 6.

Next, with reference to FIGS. 6 and 7, an event notification method carried out using the event notification device of the present embodiment will be described. In FIGS. 6 and 7, parts that are the same as those in FIGS. 1 and 2 are given the same reference numerals. The event notification method carried out using the event notification device of the present embodiment is the same as the event notification method carried out using the event notification device of the first embodiment, except that it further includes an interval data outputting step. The interval data outputting step corresponds to "a timer management step of managing a time elapsed until the user adapts to the stimulus (hereinafter also referred to simply as "adaptation time")".

(Interval Data Outputting Step)

According to the event notification device of the present embodiment, in the stimulus presenting step, the timer management unit 65 outputs, as an electrical signal, interval data d for managing an adaptation time of the user to the presented stimulus to the stimulus control unit 12 (Step S701 in FIG. 7). The adaptation time will be described with reference to FIG. 4. The adaptation time is a time ($\Delta t$) elapsed until a user gets used to (i.e., adapts to) the presented stimulus. When the stimulus is a pressure stimulus, $\Delta t$ is represented by the following formula (III), for example. That is, the adaptation time is proportional to the amount of a pressure stimulus, and is inversely proportional to a pressure stimulus area.

$$\Delta t_k \propto \Delta I_k / S \qquad (III)$$

$\Delta t_k$: adaptation time in each time step
$\Delta I_k$: amount of stimulus in each time step
S: pressure stimulus area This adaptation time can be used as the time set in each time step. With this configuration, the user gets used to the stimulus being presented and becomes unaware of the stimulus. Thus, according to the event notification device of the present embodiment, it is possible to present the stimulus in the event notification preparation step while still more effectively preventing the user from noticing the stimulus.

Figure 8:
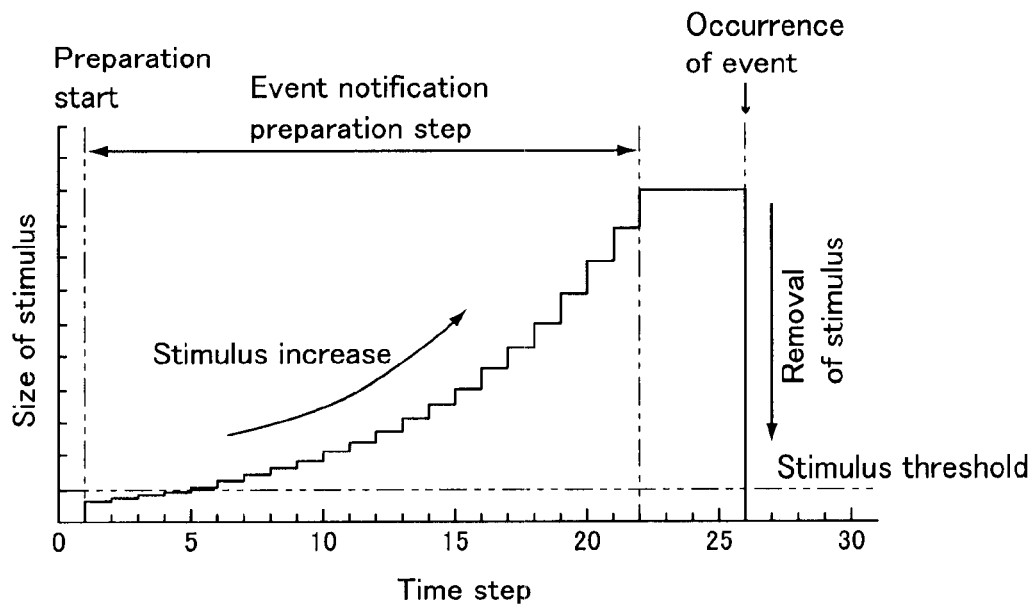
FIG. 8 is a graph showing an example of the relationship between an adaptation time and the size of a stimulus in the event notification method of FIG. 7.

FIG. 8 shows an example of the relationship between an adaptation time and the size of a stimulus to be presented to a user. In FIG. 8, the time steps 1 to 22 correspond to the event notification preparation step, and the time step 26 corresponds to the event notification step. In this example, the adaptation time (the time of each time step) is made constant. As described above, the adaptation time is proportional to the amount of a pressure stimulus, and is inversely proportional to a pressure stimulus area. In this example, the pressure stimulus area is not considered. Thus, the amount of increase in pressure stimulus per time step is determined by $\Delta I_k$, so that, in the event notification preparation step in this example, the amount of increase in pressure stimulus becomes greater as the time step proceeds. Although the pressure stimulus increases stepwise on a time step-by-time step basis in this example, the present invention is not limited to this example. The pressure stimulus may be increased along a curve, which is approximates to the above-described stepwise increase, for example.

Third Embodiment

Figure 9:
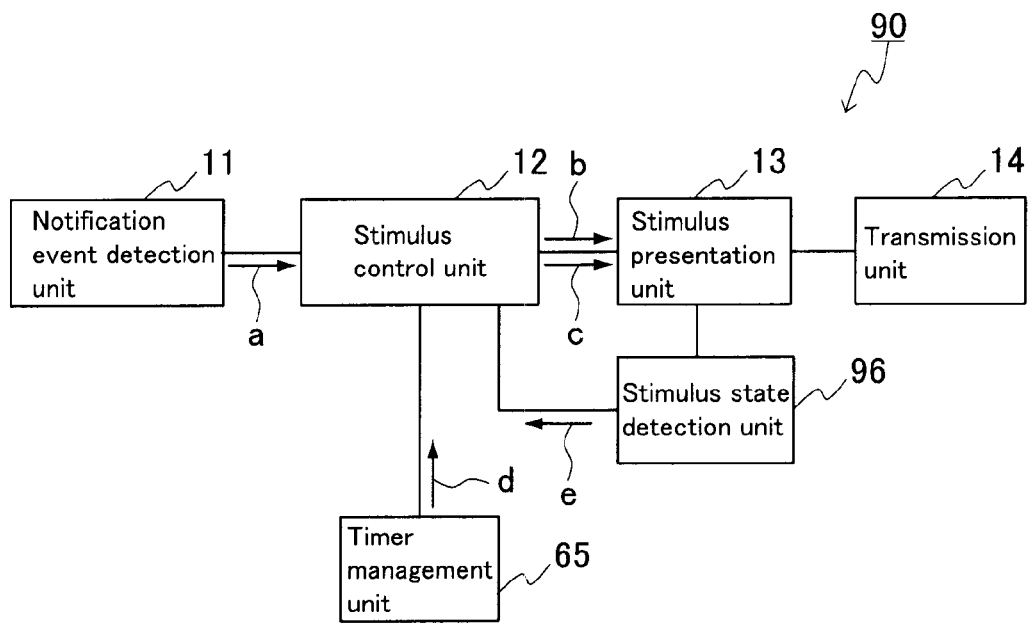
FIG. 9 is a block diagram showing an example of the configuration of an event notification device according to the third embodiment of the present invention.

FIG. 9 shows an example of the configuration of an event notification device according to the present embodiment. In FIG. 9, parts that are the same as those in FIG. 6 are given the same reference numerals. As shown in FIG. 9, this event notification device 90 has the same configuration as the event notification device of the second embodiment, except that it further includes a stimulus state detection unit 96. That is, this event notification device 90 includes a notification event detection unit 11, a stimulus control unit 12, a stimulus presentation unit 13, a transmission unit 14, a timer management unit 65, and the stimulus state detection unit 96. The stimulus state detection unit 96 is electrically connected to the stimulus control unit 12 and the stimulus presentation unit 13.

The stimulus state detection unit includes a central processing unit (CPU) that can construct and output feedback data to be described below, for example.

Figure 10:
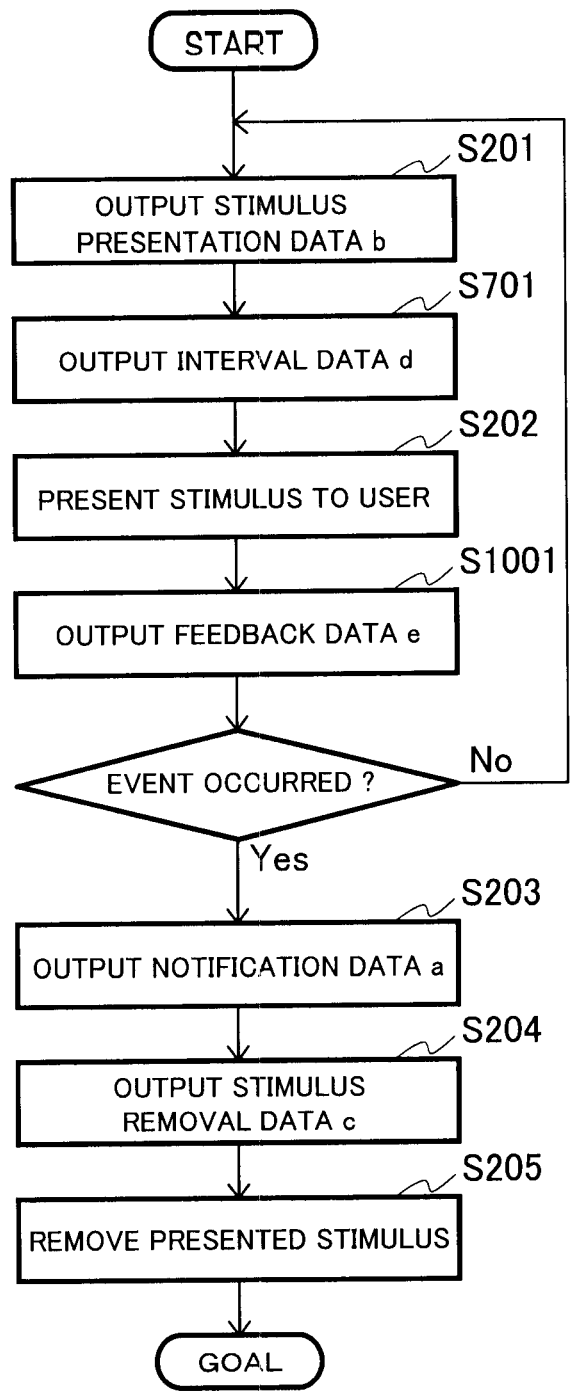
FIG. 10 is a flowchart illustrating an example of an event notification method carried out using the event notification device shown in FIG. 9.

Next, with reference to FIGS. 9 and 10, an event notification method carried out using the event notification device of the present embodiment will be described. In FIGS. 9 and 10, parts that are the same as those in FIGS. 6 and 7 are given the same reference numerals. The event notification method carried out using the event notification device of the present embodiment is the same as the event notification method carried out using the event notification device of the second embodiment, except that it further includes a feedback data outputting step. The feedback data outputting step corresponds to "a feedback step of detecting a stimulus in the event notification preparation step and the event notification step and feeding back a value of the thus-detected stimulus to the event notification preparation step and the event notification step".

(Feedback Data Outputting Step)

According to the event notification device of the present embodiment, in the state where the stimulus is being presented to a user, the stimulus state detection unit 96 detects the stimulus presentation state in the stimulus presentation unit 13. Then, based on the result of this detection, the stimulus state detection unit 96 outputs, as an electrical signal, feedback data e for accurately controlling the stimulus presentation unit 13 to the stimulus control unit 12 (Step S1001 in FIG. 10). With this configuration, it is possible to improve the accuracy of the stimulus to be presented to the user, for example.

Fourth Embodiment

Figure 11:
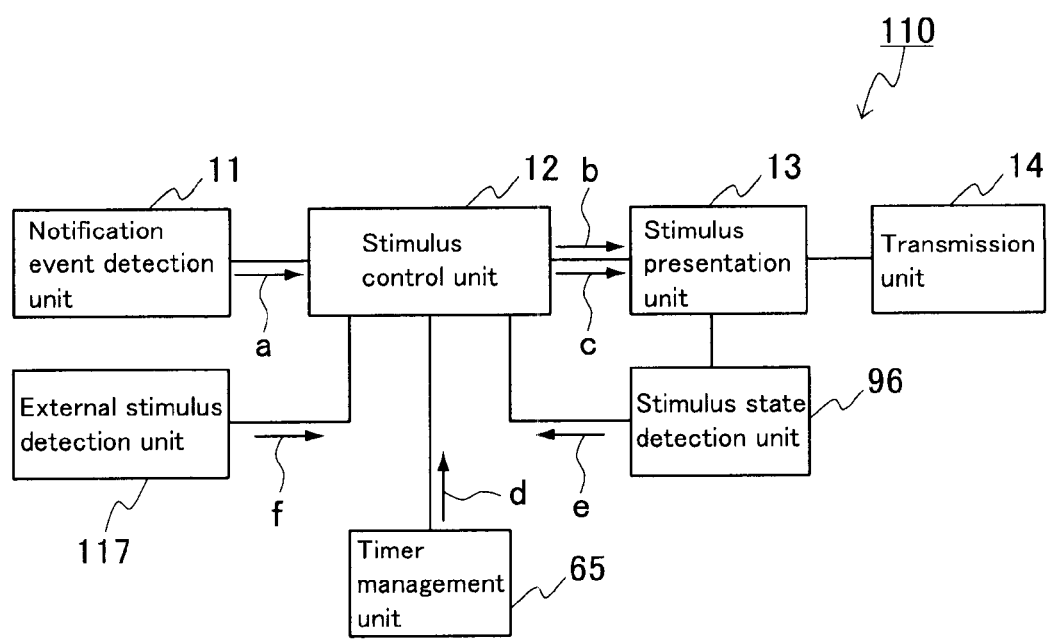
FIG. 11 is a block diagram showing an example of the configuration of an event notification device according to the fourth embodiment of the present invention.

FIG. 11 shows an example of the configuration of an event notification device according to the present embodiment. In FIG. 11, parts that are the same as those in FIG. 9 are given the same reference numerals. As shown in FIG. 11, this event notification device 110 has the same configuration as the event notification device of the third embodiment, except that it further includes an external stimulus detection unit 117. That is, this event notification device 110 includes a notification event detection unit 11, a stimulus control unit 12, a stimulus presentation unit 13, a transmission unit 14, a timer management unit 65, a stimulus state detection unit 96, and the external stimulus detection unit 117. The external stimulus detection unit 117 is electrically connected to the stimulus control unit 12.

The external stimulus detection unit includes a central processing unit (CPU) that can construct and output preparation start timing data to be described below, for example.

Figure 12:
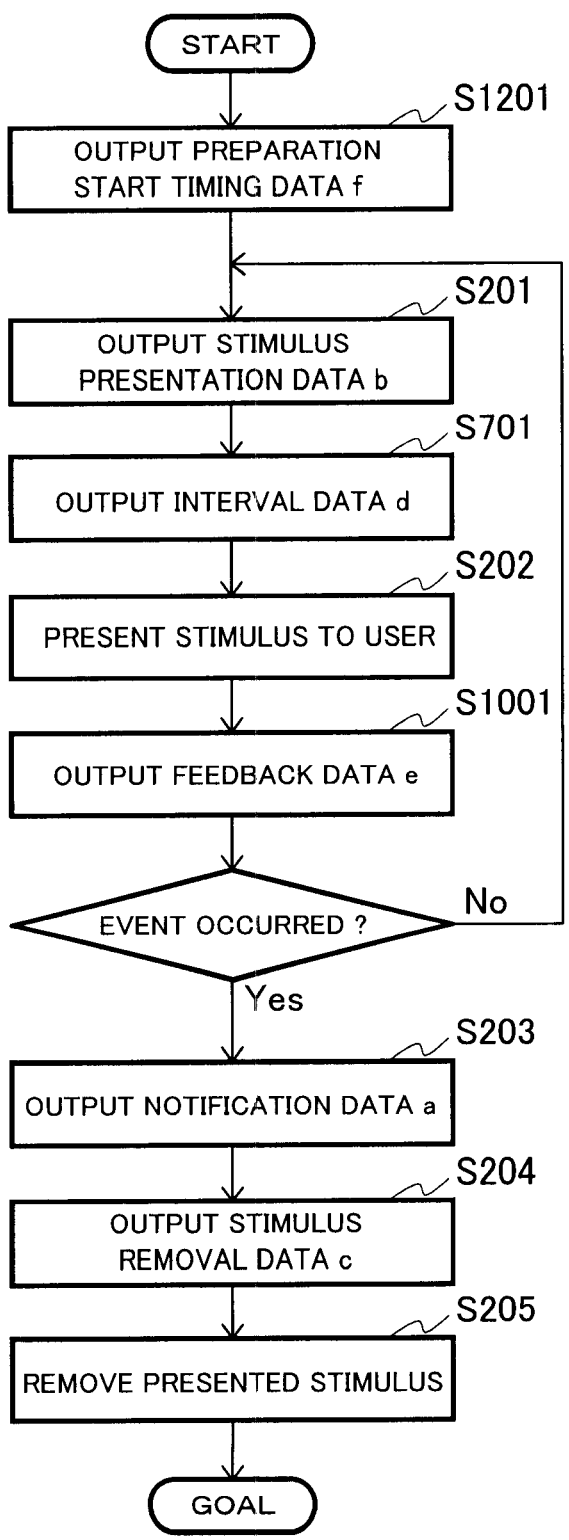
FIG. 12 is a flowchart illustrating an example of an event notification method carried out using the event notification device shown in FIG. 11.

Next, with reference to FIGS. 11 and 12, an event notification method carried out using the event notification device of the present embodiment will be described. In FIGS. 11 and 12, parts that are the same as those in FIGS. 9 and 10 are given the same reference numerals. The event notification method carried out using the event notification device of the present embodiment is the same as the event notification method carried out using the event notification device of the third embodiment, except that it further includes a preparation start timing data outputting step. The preparation start timing data outputting step corresponds to "a timing adjustment step of detecting a stimulus from outside of the device and adjusting a timing of starting the event notification preparation step".

(Preparation Start Timing Data Outputting Step)

In the event notification device according to the present embodiment, the external stimulus detection unit 117 detects a stimulus from outside of the device. Then, based on the result of this detection, the external stimulus detection unit 117 outputs, as an electrical signal, preparation start timing data f for adjusting the timing of outputting the stimulus presentation data b to the stimulus control unit 12 (Step S1201 in FIG. 12). With this configuration, it is possible to start the presentation of a stimulus to a user in such a manner that the stimulus is lost among the noise, vibration, or pressure generated in life scenes where the user touches a terminal, the user wears a terminal, the user operates a terminal, and the like, for example. This allows an initial stimulus at the time of starting the preparation to be greater, for example. As a result, it becomes possible to shorten the time of the event notification preparation step, for example.

Fifth Embodiment

Figure 13A:
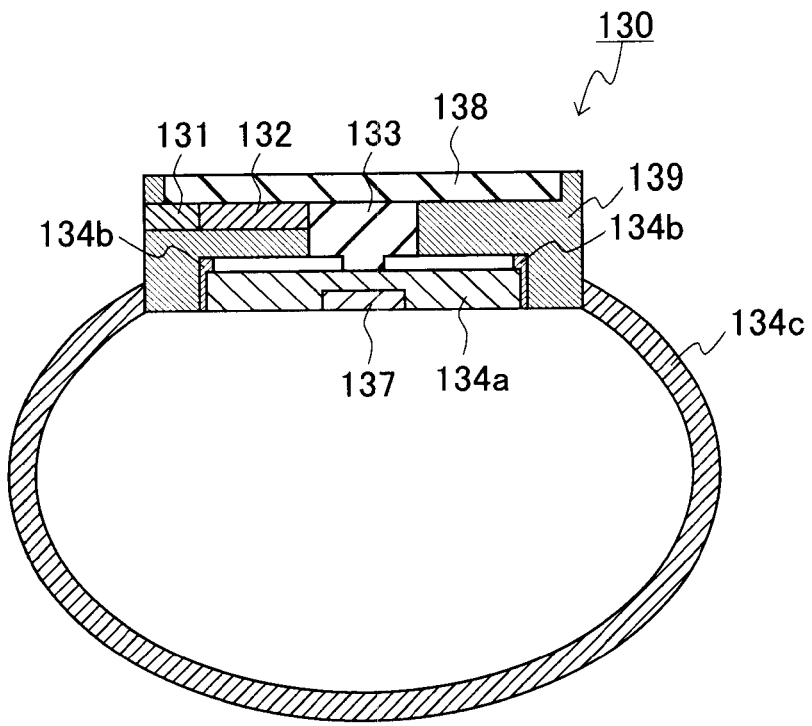
FIG. 13A is a sectional view showing an example of the configuration of an event notification device according to the fifth embodiment of the present invention.
Figure 13B:
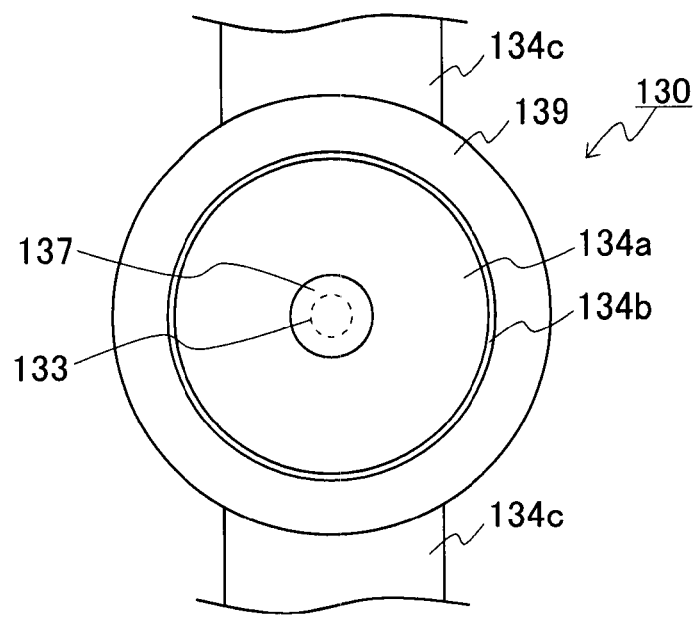
FIG. 13B is a bottom view of the same.

FIG. 13 shows an example of the configuration of an event notification device according to the present embodiment. FIG. 13A is a sectional view of this event notification device, and FIG. 13B is a bottom view of the same. The event notification device according to the present embodiment is an example of a device embodying the event notification device of the fourth embodiment. This device is a wrist-mounted type device. As shown in FIG. 13, this event notification device 130 includes a transmission and reception section 131 (notification event detection unit), a control section 132, a stimulus presentation actuator 133 (stimulus presentation unit), a movable transmission section 134a, a guide 134b, a band section 134c, a detection section 137, a display section 138, and an outer housing 139. Hereinafter, the stimulus presentation actuator is simply referred to as the "actuator". The transmission and reception section 131, the control section 132, and the actuator 133 are disposed in the outer housing 139. Both ends of the band section 134c are joined to an outer peripheral surface of the outer housing 139. The movable transmission section 134a is disposed along the guide 134b, and in this state, the movable transmission section 134a is mechanically joined to the actuator 133. The detection section 137 is disposed on a side of the movable transmission section 134a to be in contact with a user. The display section 138 is disposed on a surface of the outer housing 139 on a side opposite to the movable transmission section 134a. The transmission and reception section 131, the actuator 133, the detection section 137, and the display section 138 are electrically connected to the control section 132. The control section 132 includes the above-described stimulus control unit and timer management unit. The detection section 137 includes the above-described presentation state detection unit and external stimulus detection unit. The movable transmission section 134a, the guide 134b, and the band section 134c altogether serves as the above-described transmission unit in the event notification device according to the present embodiment.

Figure 14:
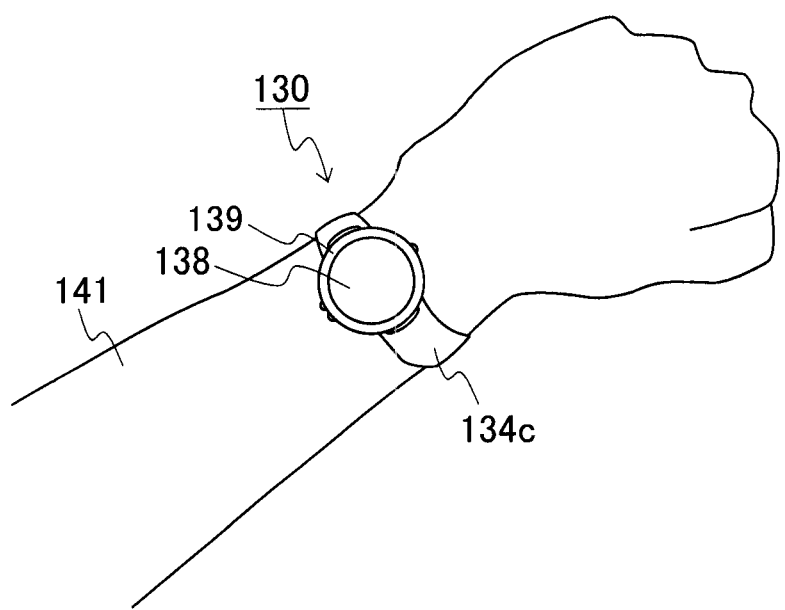
FIG. 14 is a perspective view showing an example of an event notification method carried out using the event notification device shown in FIG. 13.
Figure 15A:
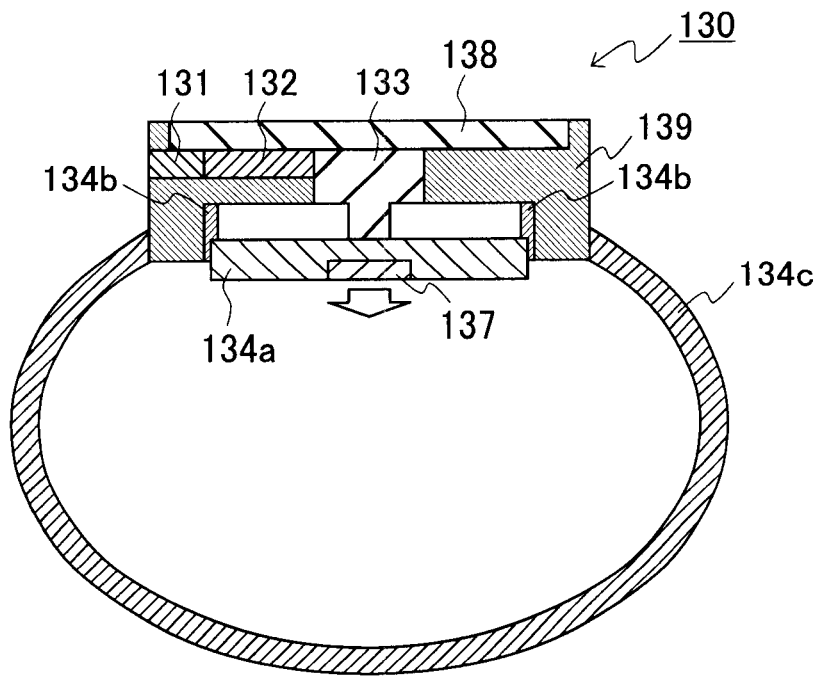
FIG. 15 shows sectional views each showing the example of the event notification method carried out using the event notification device shown in FIG. 13.
Figure 15B:
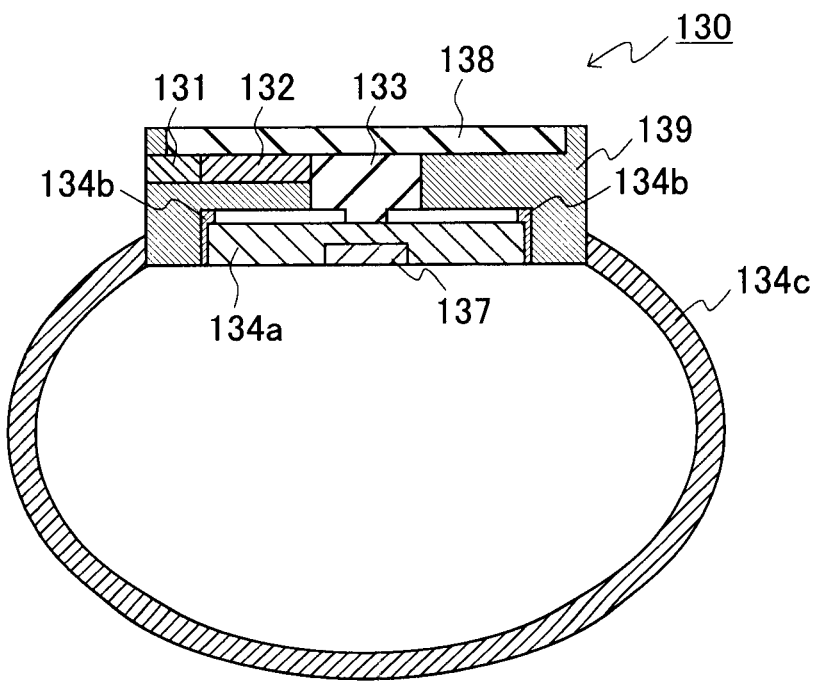
Figure 16:
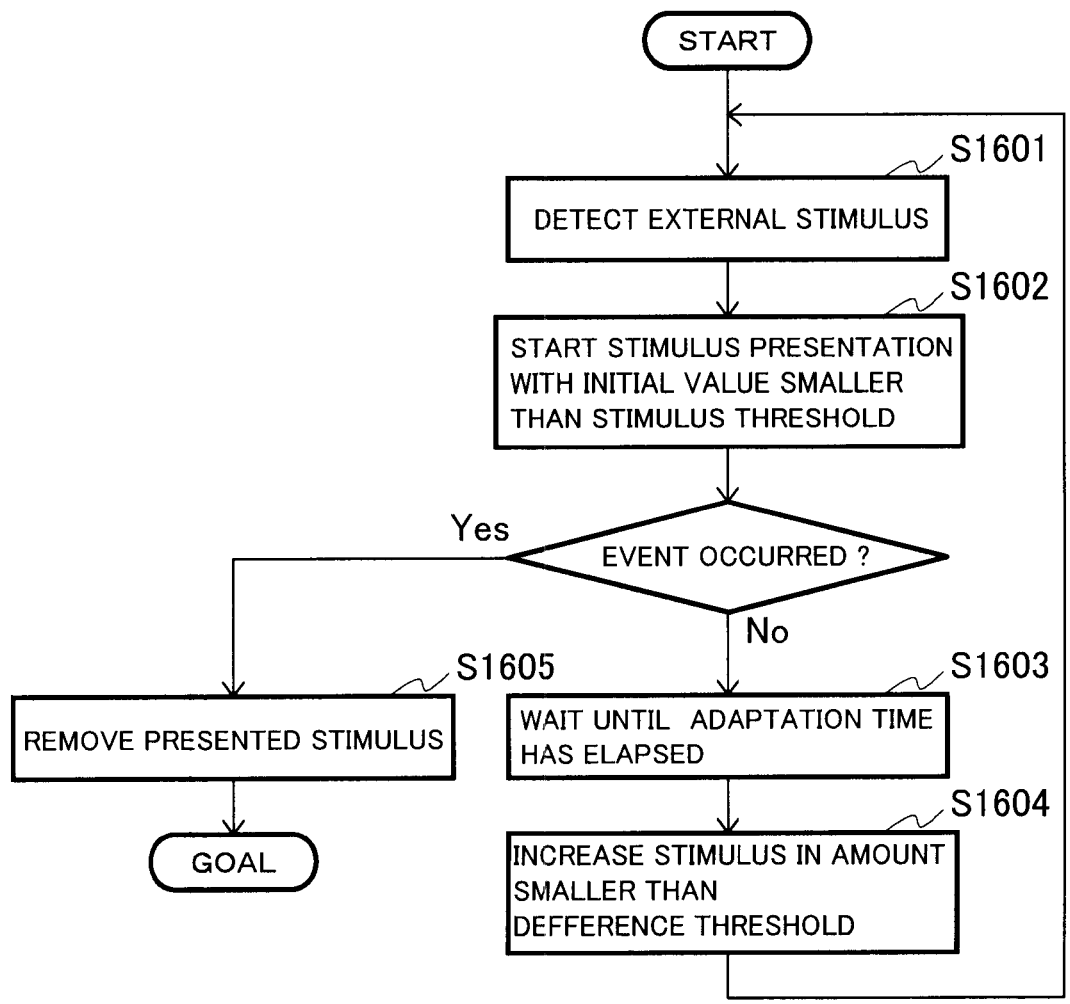
FIG. 16 is a flowchart illustrating the example of the event notification method carried out using the event notification device shown in FIG. 13.

Next, with reference to FIGS. 14 to 16, an event notification method carried out using the event notification device of the present embodiment will be described. FIG. 14 is a perspective view showing the state where the event notification device of the present embodiment is worn. FIG. 15 shows sectional views illustrating the mechanism by which the device presents a pressure stimulus to a user. FIG. 16 is a flowchart illustrating the event notification method carried out using the device. In FIGS. 14 to 16, parts that are the same as those in FIG. 13 are given the same reference numerals. First, the event notification device 130 of the present embodiment is wrapped around a user's wrist 141, as shown in FIG. 14. The event notification device according to the present embodiment is a device that notifies an event by removing a pressure stimulus being presented to the user's wrist. This event notification device 130 is activated in the state where it is wrapped around the user's wrist. In this state, first, the detection section 137 detects a stimulus from the outside of the device (Step S1601 in FIG. 16, the figure number is omitted hereinafter). Based on the result of this detection, the above-described preparation start timing data is outputted to the control section 132. With this configuration, it becomes possible to start the presentation of the pressure stimulus with an optimal timing that allows the user to be prevented from noticing the stimulus, for example.

After receiving the preparation start timing data, the control section 132 outputs stimulus presentation data for presenting a stimulus to a user to the actuator 133 in such a manner that an initial value of the stimulus is smaller than the above-described stimulus threshold. After receiving the stimulus presentation data, the actuator 133 generates a force that moves the movable transmission section 134c toward the outside of the outer housing 139. The force is transmitted to the movable transmission section 134a disposed in the manner as described above, and the movable transmission section 134a moves toward the outside of the outer housing 139 (in the arrow direction in FIG. 15A) along the guide 134b, as shown in FIG. 15A. Since the user's wrist is surrounded by the band section 134c, the pressure stimulus generated by the above-described movement is presented to the user as a squeezing pressure. In this manner, stimulus presentation to the user is started with a pressure stimulus smaller than the above-described stimulus threshold (Step S1602). In FIG. 15A, the user's wrist (numeral 141 in FIG. 14) is not shown for the sake of convenience in illustration. The same applied to FIG. 15B hereinafter. Furthermore, as described above, both Steps S1601 and S1602 are steps for preventing the user from noticing the presentation of the pressure stimulus more effectively. Thus, in using the event notification device according to the present embodiment, it is not always necessary to perform both of these steps. The same applies to Steps S1603 and S1604 to be described below.

In the presentation of a pressure stimulus started in the above-described manner, in the state where no event occurs (No), the control section 132 outputs the above-described interval data in order to prevent the user from noticing the presentation of the pressure stimulus still more effectively. With this configuration, the increase in pressure stimulus is suspended until the above-described adaptation time of the user to the pressure stimulus has elapsed (Step S1603), and after the user has adapted to the pressure stimulus, the amount of the stimulus is increased. In this manner, the pressure stimulus is increased gradually. Furthermore, the pressure stimulus to be presented to the user is increased in an amount smaller than the difference threshold (Step S1604). This allows the user to be prevented from noticing the presentation of the pressure stimulus still more effectively, for example. In this state, the detection section 137 detects the pressure stimulus being presented to the user, and based on the result of this detection, the control section 132 outputs the above-described feedback data. With this configuration, the pressure stimulus presented, to the user can be controlled accurately, for example. Until an event occurs, the above-described steps are repeated, thereby maintaining the state where the stimulus is being presented to the user.

As described above, the adaptation time of the user to the pressure stimulus is proportional to the amount of a pressure stimulus, and is inversely proportional to a pressure stimulus area. The area of a portion to which the actuator 133 can present a pressure stimulus is set to be a predetermined area, and the adaptation time of the user to a pressure stimulus of 50 [mg] ($5.0 \times 10^{-5} \times 9.8 = 0.5$ [mN]) is set to 2.4 [second], for example. In this case, in order to make the above-described $\Delta I_L$ about 8 [mN], an adaptation time of 38.4 [second] is required, assuming that a pressure stimulus area as the area of a portion presenting a pressure stimulus to the user is equal to the area of a portion to which the actuator 133 can present a pressure stimulus. However, in the event notification device according to the present embodiment, the movable presentation unit 134a and the band section 134c are used for the presentation of a pressure stimulus to a user, as described above (see FIG. 13B, for example). Thus, it is possible to make the pressure stimulus area about several ten times greater than the area of a portion to which the actuator 133 can present a pressure stimulus, for example, so that the adaptation time can be reduced to one tenth to one several tenth, for example.

If an event occurs (Yes) in the above-described state, for example, the transmission and reception section 131 receives a signal notifying the occurrence of the event and then detects the event. As a result of detecting the event, the transmission and reception section 131 outputs the above-described notification data to the control section 132. After receiving the notification data, the control section 132 outputs the above-described stimulus removal data to the actuator 133. After receiving the stimulus removal data, the actuator 133 stops generating the force. Thus, the force moving the movable transmission section 134a disappears, so that the movable transmission section 134a returns to the original position as shown in FIG. 15B, for example. As a result, the stimulus being presented to the user is removed (Step S1605), whereby the occurrence of the event is notified to the user. With the above-described configuration, the event notification device according to the present embodiment can notify an event to a user with excellent immediacy without giving a sense of discomfort to the user. At the time of event notification, the content of the event may be displayed on the display section 138, for example. The event may be as described above.

Sixth Embodiment

Figure 17:
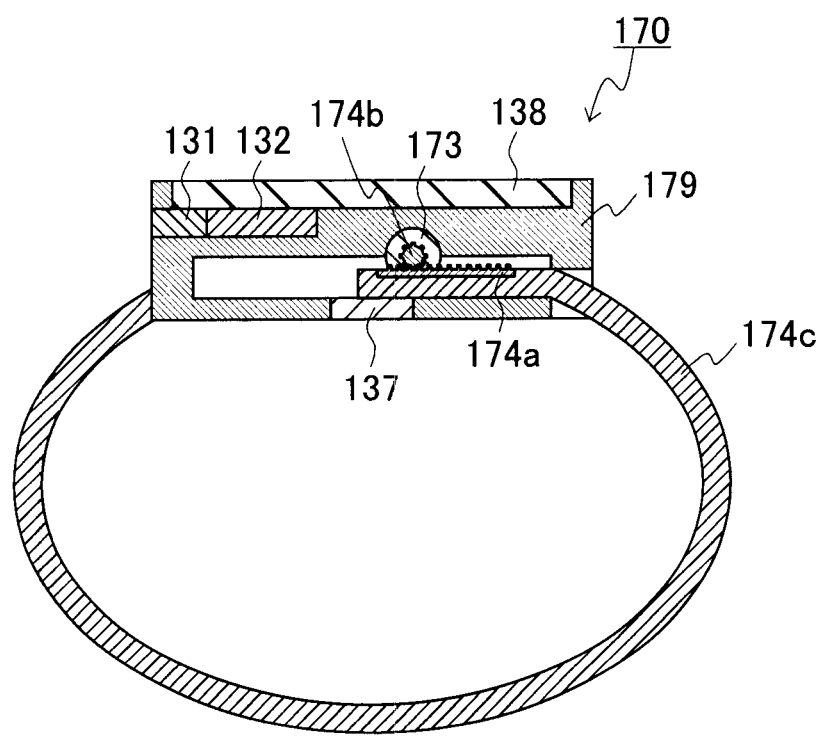
FIG. 17 is a sectional view showing an example of the configuration of an event notification device according to the sixth embodiment of the present invention.

FIG. 17 shows an example of the configuration of an event notification device according to the present embodiment. The event notification device according to the present embodiment is another example of a device embodying the event notification device of the fourth embodiment. This device is a wrist-mounted type device. As shown in FIG. 17, this event notification device 170 includes a transmission and reception section 131, a control section 132, an actuator 173, a rack 174a, a pinion 174b, a band section 174c, a detection section 137, a display section 138, and an outer housing 179. The transmission and reception section 131, the control section 132, the actuator 173, and the pinion 174b are disposed in the outer housing 179. The detection section 137 is disposed on a side of the outer housing 179 to be in contact with a user. The display section 138 is disposed on a surface of the outer housing 179 on a side opposite to the detection section 137. The pinion 174b is mechanically connected to the actuator 173, and is disposed so as to be rotatable with a force generated by the actuator 173. The rack 174a is fixed to one end of the band section 174c. The other end of the band section 174c is joined to an outer peripheral surface of the outer housing 179. One end of the band section 174c is drawn into the outer housing 179 so as to allow the rack 174a and the pinion 174b to engage with each other. The transmission and reception section 131, the actuator 173, the detection section 137, and the display section 138 are electrically connected to the control section 132. Except for the above, the event notification device of the present embodiment has the same configuration as the above-described event notification device of the fifth embodiment.

Figure 18A:
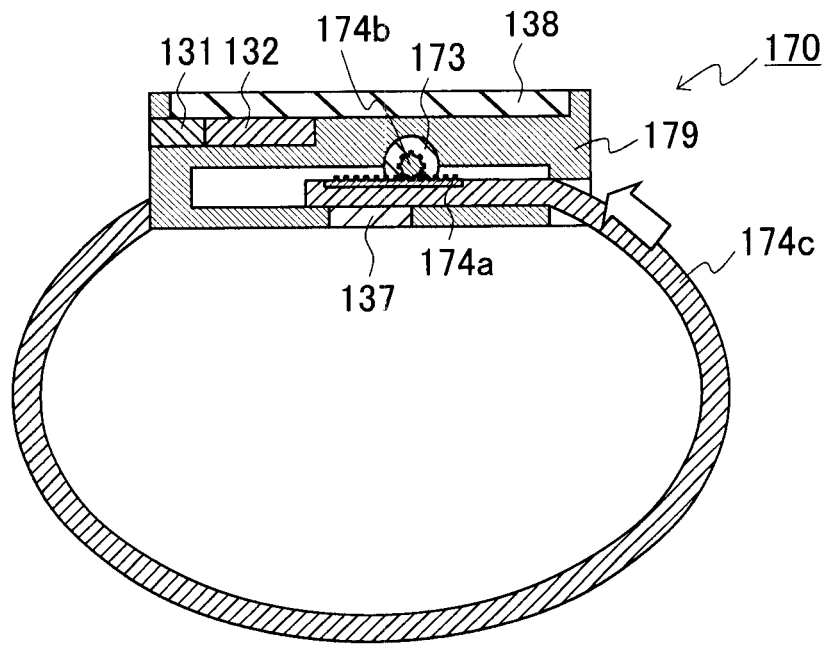
FIG. 18 shows sectional views each showing an example of an event notification method carried out using the event notification device shown in FIG. 17.
Figure 18B:
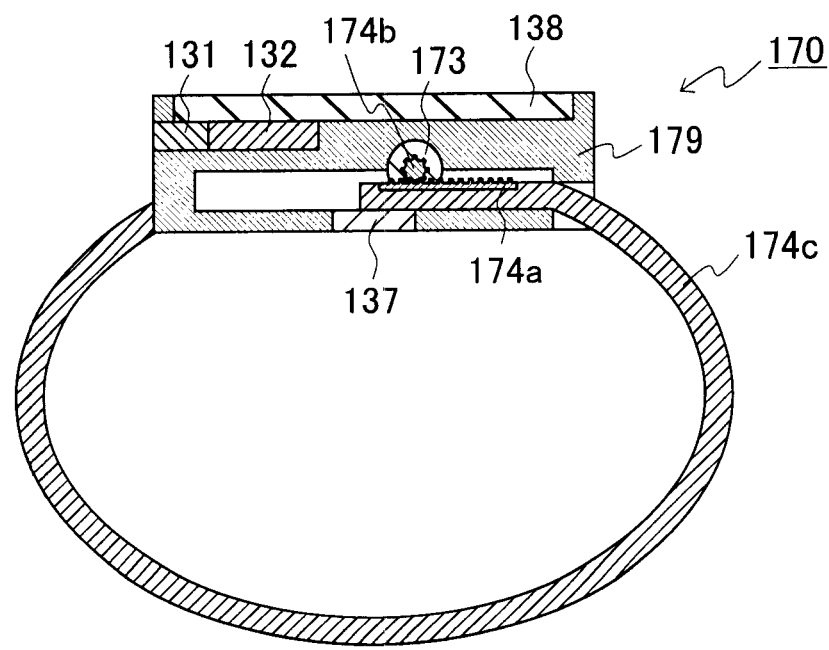

Next, with reference to FIG. 18, an event notification method carried out using the event notification device of the present embodiment will be described. In FIG. 18, parts that are the same as those in FIG. 17 are given the same reference numerals. The event notification method carried out using the event notification device of the present embodiment is the same as the event notification method carried out using the event notification device of the fifth embodiment, except for the following. That is, in the event notification device according to the present embodiment, the pinion 174b is rotated with the force generated by the actuator 173. By this rotation, the rack 174a is moved toward the other end of the band section in the outer housing 179, as shown in FIG. 18A. By this movement, the end of the band section 174c to which the rack 174a is fixed is drawn into the outer housing 179. This causes a squeezing pressure to be presented to the user's wrist (the pressure stimulus applied in the arrow direction in FIG. 18A). On the other hand, when an event occurs, the force is removed, whereby the pinion 174b rotates in a direction opposite to the direction in the case of presenting a squeezing pressure. Thus, the rack 174a returns to the original position, as shown in FIG. 18B, for example. As a result, the stimulus being presented to the user is removed, whereby the occurrence of the event is notified to the user.

Seventh Embodiment

Figure 19A:
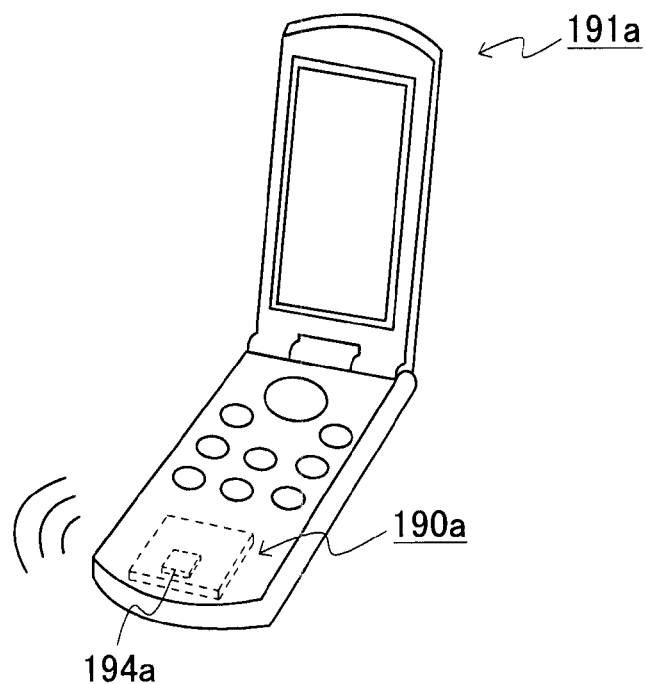
FIG. 19 shows perspective views each showing an example of the configuration of an event notification device according to the seventh embodiment of the present invention.

FIG. 19A shows an example of the configuration of an event notification device according to the present embodiment. The event notification device according to the present embodiment is a still another example of a device embodying the event notification device of the fourth embodiment. As shown in FIG. 19A, the event notification device 190a of the present embodiment is incorporated in a mobile phone 191a, and includes a vibrator 194a as the above-described transmission unit. Other components are omitted in FIG. 19A. In FIG. 19A, for the sake of convenience in illustration, some of buttons of the mobile phone 191a are not shown. Furthermore, although the event notification device of the present embodiment is incorporated in a mobile phone, the present invention is not limited to this example. For example, the event notification device may be incorporated in electronic equipment such as a portable notebook computer, a portable game machine, or a portable music player.

The vibrator generates vibration by, for example, a vibratory motion of a piezoelectric element, an eccentric motor, or the like. In the event notification device of the present embodiment, an event is notified to a user by the change in vibration of the vibrator. The mechanism of such notification will be described below. It is to be noted, however, that the following mechanism is merely based on a speculation, and the present invention is by no means limited or restricted by this speculation.

The receptors mainly sensing vibration are, for example, a Meissner's corpuscle (FAI) and a Pacinian corpuscle (FAII). The stimulus threshold of the Meissner's corpuscle (FAI) is about 0.58 [mN]. The stimulus threshold of the Pacinian corpuscle (FAII) is about 0.54 [mN]. By changing the amplitude of vibration, it is possible to change the size of a stimulus caused by the vibration. By this change in amplitude, an event is notified to the user. The above-described receptors have frequency characteristics different from each other. In vibrators used in mobile phones, vibration of a frequency around 200 [Hz], to which both the receptors exhibit the highest sensitivity, is employed, for example. The above-described Pacinian corpuscle (FAII) is a receptor that can particularly sense the vibration in the above-described frequency band, and the stimulus threshold thereof generally is −20 [dB] (standard value: 1.0 μm). Assuming that the frequency of the vibration is 200 [Hz], the Weber fraction of the amplitude with respect to the vibration stimulus is about 0.2. Thus, as in the above-described second embodiment, a recurrence formula can be established by the stimulus threshold and the Weber fraction.

In the event notification device according to the present embodiment, data for controlling the amplitude of vibration is used as the above-described stimulus presentation data and the above-described stimulus removal data, for example. Except for the above, the event notification device of the present embodiment can notify an event in the same manner as the above-described event notification device of the fourth embodiment. With this configuration, a vibration stimulus can be presented to a user without being noticed by the user until an event such as an incoming call occurs, and when the event occurs, the event can be notified to the user with excellent immediacy by removing the vibration stimulus being presented to the user, for example.

The event notification device of the present embodiment can be produced at low cost because it can use a vibrator included in a mobile phone as it is. Furthermore, the event notification device of the present embodiment preferably is used for notification of events that occur at a previously known timing, such as the notification of a preset time and the completion of data transmission and reception. For notification of such events, it is preferable to start the presentation of a stimulus at a timing obtained by subtracting the time for presenting the stimulus to a user from the timing of notifying an event.

Figure 19B:
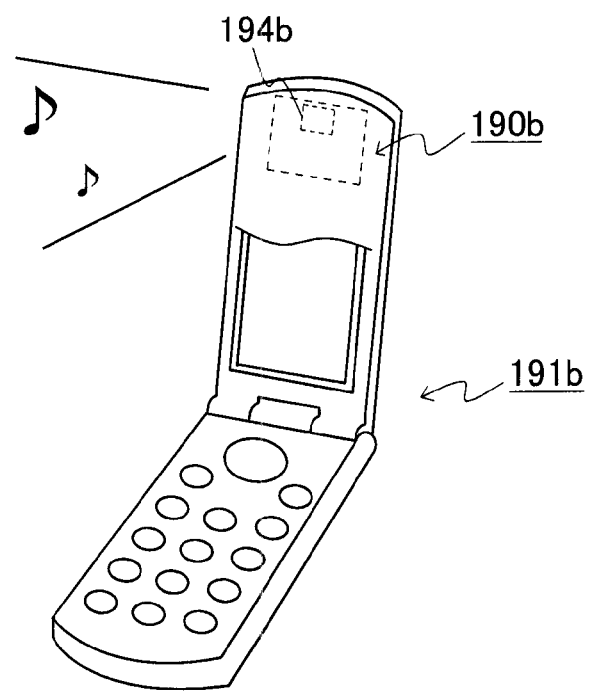

In the event notification device according to the present embodiment, an event may be notified to a user by, for example, the change in amplitude of a sound, instead of the change in amplitude of vibration. FIG. 19B shows an example of the configuration of this event notification device. As shown in FIG. 19B, this event notification device 190b is incorporated in a mobile phone 191b, and includes a speaker 194b as the above-described transmission unit.

Except for the above, this event notification device has the same configuration as the above-described event notification device 190a. In FIG. 19B, part of a display section in the mobile phone 191b is not shown for the sake of convenience in illustration.

As the speaker, a conventionally known speaker can be used. In this event notification device, an event is notified to a user by the change in sound from the speaker utilizing an audible range in which humans can sense a sound. The mechanism of such notification will be described below. It is to be noted, however, that the following mechanism is merely based on a speculation, and the present invention is by no means limited or restricted by this speculation.

The stimulus threshold of a sound stimulus is a minimum audible threshold in the audible range. The minimum audible threshold is about 20[dB] when the frequency of a sound is 100 [Hz]. Furthermore, the Weber fraction of the amplitude with respect to a sound stimulus is about 0.1 as a rough approximation. Thus, similarly to the case of the above-described vibration, a recurrence formula can be established by the stimulus threshold and the Weber fraction.

In this event notification device, data for controlling the amplitude of a sound is used as the above-described stimulus presentation data and the above-described stimulus removal data, for example. Except for the above, this event notification device can notify an event in the same manner as the above-described event notification device of the fourth embodiment. With this configuration, a sound stimulus can be presented to a user without being noticed by the user until an event such as an incoming call occurs, and when the event occurs, the event can be notified to the user with excellent immediacy by removing the sound stimulus being presented to the user, for example.

In the event notification device according to the present embodiment, an event may be notified to a user by, for example, the change in the number of vibrations (frequency) or the number of vibrations (frequency) of a sound, instead of the change in amplitude of vibration or in amplitude of a sound. This event notification device has the same configuration as the above-described event notification device 190a or 190b.

In this event notification device, an event is notified to a user by changing the frequency of vibration generated by a vibrator or the frequency of a sound emitted by a speaker, thereby changing the size of a stimulus perceived through a sense of a human. The mechanism of such notification will be described below. It is to be noted, however, that the following mechanism is merely based on a speculation, and the present invention is by no means limited or restricted by this speculation.

Figure 20:
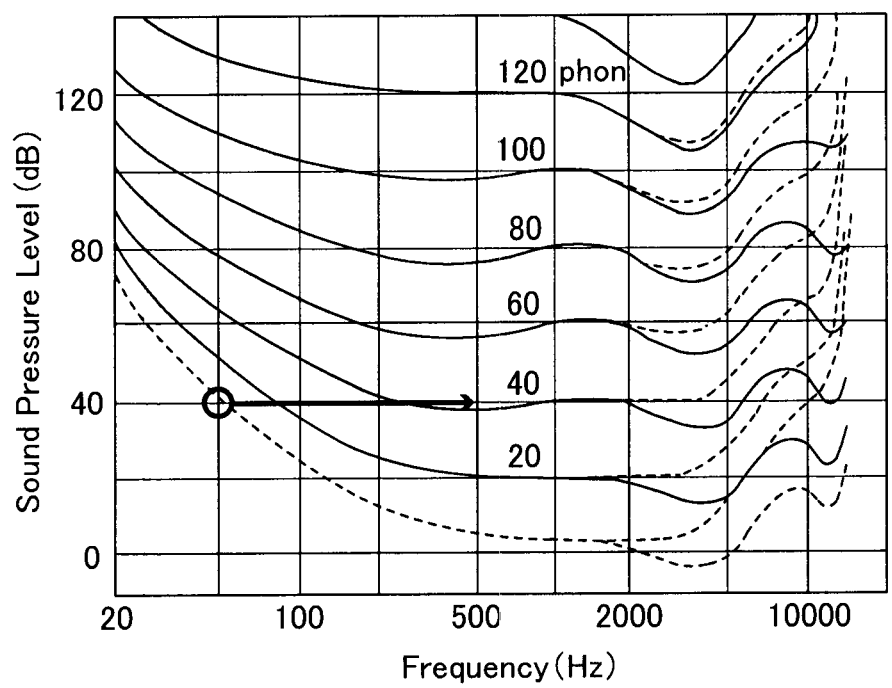
FIG. 20 is an example of equal sensation contours for the size of a sound.

FIG. 20 shows equal sensation contours (equal-loudness contours) regarding the size of a sound, which was reported by Robinson & Dadson (1956). Each value used in these equal sensation contours indicates a point of subjective equality regarding how a sound is heard, and is represented by "phon", instead of [dB] indicating a sound pressure level. As shown in FIG. 20, even sounds at the same sound pressure level are heard differently depending on the frequency thereof (see "Shinpen Kankaku•Chikaku Shinrigaku handbook (New Edition Sensation/Perception Psychology Handbook)", Tadasu OYAMA, Shogo IMAI, and Tenji WAKE, p. 1021). For example, in the equal sensation contour of 60 phon, a sound producing a sound pressure level of 60 [dB] is perceived as a sound lower than the sound pressure level of 60 [dB] when the frequency of the sound is 100 [Hz], whereas it is perceives as a sound higher than the sound pressure level of 60 [dB] when the frequency of the sound is 500 [Hz]. Utilizing this phenomenon, the frequency is shifted in the vicinity of the above-described minimum audible threshold.

Figure 21:
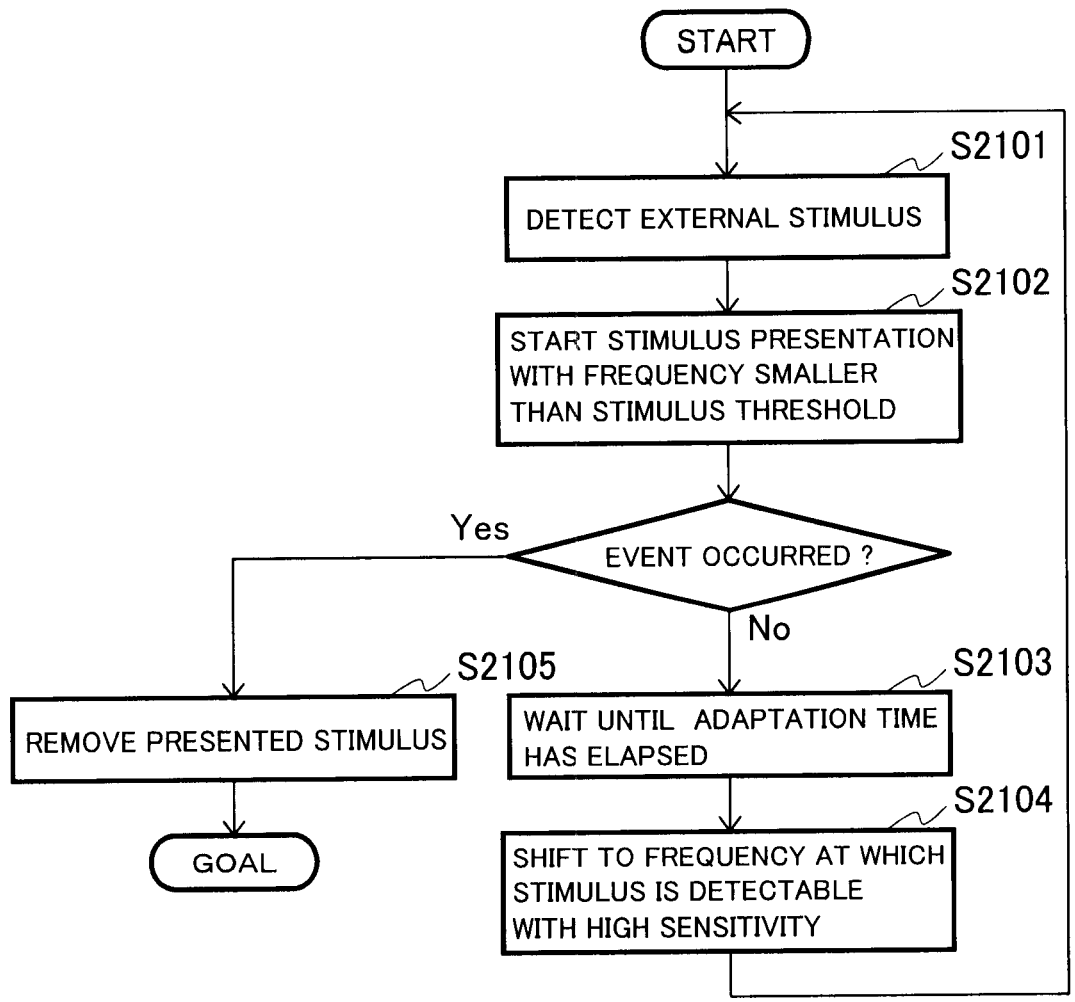
FIG. 21 is a flowchart illustrating an example of an event notification method carried out using the event notification device shown in FIG. 19.

With reference to FIG. 21, an event notification method carried out using this event notification device will be described. First, prior to the presentation of a stimulus to a user, an external stimulus is detected (S2101). Next, the presentation of a stimulus to a user is started at a frequency smaller than the above-described minimum audible threshold, i.e., at a frequency smaller than the stimulus threshold (S2102). For example, if an output is a sound with a sound pressure level of 40 [dB] and having a frequency of 50 [Hz] is outputted, it is difficult to perceive the output as a sound because such a sound is around the above-described audible range, as shown in FIG. 20. The presentation of a stimulus is started with this value being set to an initial value. Subsequently, the frequency of the output is shifted to a frequency at which the stimulus is detectable with high sensitivity (S2104). For example, when the frequency of the output is shifted from the above-described initial value to a frequency around 500 [Hz], it exceeds the equal sensation contour of 40 phon as shown in FIG. 20, so that the output can be perceived as a sound. The phrase "perceived as a sound" means that a sensory organ senses the output as a sound, and does not means that the user notices the generation of the sound. How the sound having a frequency of the above-described initial value is heard is as follows: since the sound is approximately in the audible range, the subjective amount thereof is 0 phon, and the above-described Weber fraction is about 0.1 as a rough approximation. Thus, the operation is suspended until the above-described adaptation time has elapsed (Step S2103), and after the user has adapted to the stimulus, the frequency is shifted to a frequency having about 1.1 times greater subjective amount. By repeating these operations, the frequency is shifted eventually to a frequency around 500 [Hz], at which the sound can be heard loudly while the sound pressure level remains the same. In this state, when an event occurs (Yes), the sound stimulus is removed by stopping the sound, or by making the frequency of the sound smaller, for example (Step S2105). Thus, the occurrence of the event is notified to the user.

Although the frequency of a sound is described in this event notification device, the present invention is not limited to this example. For example, it is possible to construct a similar system using equal sensation contours regarding vibration. Note here that, in the event notification device according to the present embodiment, the above-described change in amplitude and change in frequency may be used in combination.

Eighth Embodiment

A program according to the present embodiment is a program that causes the above-described event notification device of the present invention to execute an event notification method using this device. The program of the present embodiment may be recorded in a recording medium, for example. The recording medium is not particularly limited, and examples thereof include HDD, CD-ROM (CD-R, CD-RW), DVD, and a memory card. Furthermore, the program of the present embodiment may be preinstalled in the above-described event notification device of the present invention, or may be installed in the same via the recording medium or a network such as the Internet, for example. It is not always necessary to install the program of the present embodiment in the event notification device of the present invention. For example, the program of the present embodiment stored in a server may cause the above-described device to execute the above-described event notification method.

As described above, the event notification device according to the present invention can notify an event with excellent immediacy without giving a shock or a sense of discomfort to a user. Thus, the event notification device of the present invention can be used for the above-described event notification in electronic equipment such as a mobile phone, a portable notebook computer, a portable game machine, a portable music player, PDA, a remote control of a television or the like, or a watch, for example. The use of the event notification device is by no means limited, and the event notification device is applicable to a wide range of fields.

While the present invention has been described above with reference to illustrative embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2009-163199 filed on Jul. 9, 2009. The entire disclosure of this Japanese patent application is incorporated herein by reference.

EXPLANATION OF REFERENCE NUMERALS

10, 60, 90, 110, 130, 170, 190a, 190b: event notification device 11: notification event detection unit
12: stimulus control unit
13: stimulus presentation unit
14: transmission unit
65: timer management unit
96: stimulus state detection unit
117: external stimulus detection unit
131: transmission and reception section
132: control section
133, 173: actuator
134a: movable transmission section
134b: guide
134c, 174c: band section
137: detection section
138: display section
139, 179: outer housing
141: user's wrist
174a: rack
174b: pinion
191a, 191b: mobile phone
194a: vibrator
194b: speaker
a: notification data
b: stimulus presentation data
c: stimulus removal data
d: interval data
e: feedback data
f: preparation start timing data

The invention claimed is:

1. An event notification device comprising:
a notification event detection unit that detects an event to be notified to a user and outputs notification data;
a stimulus control unit that outputs stimulus presentation data for providing control for presenting a stimulus to the user until the stimulus control unit receives the notification data, and outputs stimulus removal data for providing control for removing the presented stimulus after the stimulus control unit receives the notification data;
a stimulus presentation unit that presents the stimulus upon receipt of the stimulus presentation data and removes the presented stimulus upon receipt of the stimulus removal data; and
a transmission unit that transmits presentation and removal of the stimulus to the user, wherein
the stimulus presentation data provides control for presenting the stimulus to the user while increasing the stimulus gradually.

2. The event notification device according to claim 1, wherein
the stimulus presentation data provides control for presenting the stimulus to the user while increasing the stimulus gradually in an amount smaller than a difference threshold, which is a minimum stimulus difference noticeable by the user as change in stimulus.

3. The event notification device according to claim 1, wherein
the stimulus presentation data sets an initial value of the stimulus to be smaller than a stimulus threshold, which is a minimum value that allows the stimulus to be sensed by the user.

4. The event notification device according to claim 1, wherein
the stimulus removal data provides control for partially removing the presented stimulus.

5. The event notification device according to claim 1, wherein
the stimulus removal data provides control for removing the presented stimulus in such a manner that the amount of the stimulus to be removed is equal to or greater than a difference threshold, which is a minimum difference noticeable by the user as change in stimulus.

6. The event notification device according to claim 1, further comprising:
a timer management unit that outputs, to the stimulus control unit, interval data for managing an adaptation time of the user to the stimulus.

7. The event notification device according to claim 1, wherein
the stimulus is a pressure, and
the stimulus presentation unit is a stimulus presentation actuator that presents the pressure as a force.

8. The event notification device according to claim 7, wherein
the transmission unit comprises:
a movable transmission section that moves to transmit to the user the force generated by the stimulus presentation actuator when the stimulus presentation actuator is driven by an accompanying change in the pressure;
a guide that limits a moving direction of the movable transmission section; and
a band section that retains the force transmitted to the user.

9. The event notification device according to claim 7, wherein
the transmission unit comprises:
a rack and a pinion that transmit the force to the user by the stimulus presentation actuator driven by an accompanying change in the pressure; and
a band section whose length is adjustable by the rack and the pinion.

10. The event notification device according to claim 1, wherein
the stimulus is vibration,
the stimulus presentation data and the stimulus removal data control an amplitude of the vibration, and
the transmission unit is a vibrator.

11. The event notification device according to claim 1, wherein
the stimulus is a sound,
the stimulus presentation data and the stimulus removal data control a frequency of the sound, and
the transmission unit is a speaker.

12. The event notification device according to claim 1, further comprising:
a presentation state detection unit that detects a stimulus in the stimulus presentation unit and outputs, to the stimulus control unit, feedback data for accurately controlling a stimulus to be presented or removed by the stimulus presentation unit.

13. The event notification device according to claim 1, further comprising:
an external stimulus detection unit that detects a stimulus from outside of the device and outputs, to the stimulus control unit, preparation start timing data for indicating a timing of starting preparation of outputting the stimulus presentation data.

14. The event notification device according to claim 1, wherein
the event is at least one event selected from the group consisting of: arrival of a preset time; a call; receipt of an e-mail; establishment of communication; interruption of the communication; completion of download; completion of upload; completion of transmission or reception of data; occurrence of an event and a response to an operation in a game; and occurrence of an event and a response to an operation in an application.

15. An event notification method which uses the event notification device according to claim 1, the event notification method comprising:
- an event notification preparation step of preparing for event notification by presenting a stimulus to a user until an event to be notified to the user occurs;
- an event notification step of notifying the event to the user by removing the stimulus being presented to the user when the event occurs; and
- an event detection step of detecting occurrence of the event, wherein
- the event notification preparation step comprises:
  - a stimulus presentation data outputting step in which the stimulus control unit outputs the stimulus presentation data for providing control for presenting the stimulus to the user until the stimulus control unit receives the notification data;
  - a stimulus presenting step in which the stimulus presentation unit receives the stimulus presentation data and presents the stimulus to the transmission unit; and
  - a presented stimulus transmitting step in which the transmission unit transmits to the user the presentation of the stimulus,
- the event detection step comprises:
  - a notification data outputting step in which the notification event detection unit detects an event to be notified to the user and outputs the notification data, and
- the event notification step comprises:
  - a stimulus removal data outputting step in which the stimulus control unit receives the notification data and outputs the stimulus removal data for providing control for removing the presented stimulus;
  - a stimulus removing step in which the stimulus presentation unit receives the stimulus removal data and removes the presented stimulus; and
  - a stimulus removal transmitting step in which the transmission unit transmits the removal of the stimulus to the user.

16. An event notification method which uses the event notification device according to claim 6, the event notification method comprising:
- an event notification preparation step of preparing for event notification by presenting a stimulus to a user until an event to be notified to the user occurs;
- an event notification step of notifying the event to the user by removing the stimulus being presented to the user when the event occurs;
- an event detection step of detecting occurrence of the event; and
- a timer management step of managing a time elapsed until the user adapts to the stimulus, wherein
- the timer management step comprises:
  - an interval data outputting step in which the timer management unit outputs the interval data to the stimulus control unit.

17. An event notification method which uses the event notification device according to claim 12, the event notification method comprising:
- an event notification preparation step of preparing for event notification by presenting a stimulus to a user until an event to be notified to the user occurs;
- an event notification step of notifying the event to the user by removing the stimulus being presented to the user when the event occurs;
- an event detection step of detecting occurrence of the event; and
- a feedback step of detecting a stimulus in the event notification preparation step and the event notification step and feeding back a value of the thus-detected stimulus to the event notification preparation step and the event notification step, wherein
- the feedback step comprises:
  - a feedback data outputting step in which the presentation state detection unit detects a stimulus in the stimulus presentation unit and outputs the feedback data to the stimulus control unit.

18. An event notification method which uses the event notification device according to claim 13, the event notification method comprising:
- an event notification preparation step of preparing for event notification by presenting a stimulus to a user until an event to be notified to the user occurs;
- an event notification step of notifying the event to the user by removing the stimulus being presented to the user when the event occurs;
- an event detection step of detecting occurrence of the event; and
- a timing adjustment step of detecting a stimulus from outside of the device and adjusting a timing of starting the event notification preparation step, wherein
- the timing adjustment step comprises:
  - a preparation start timing data outputting step in which the external stimulus detection unit detects a stimulus from outside of the device and outputs the preparation start timing data to the stimulus control unit.

19. An event notification method comprising:
- an event notification preparation step of preparing for event notification by presenting a stimulus to a user until an event to be notified to the user occurs; and
- an event notification step of notifying the event to the user by removing the stimulus being presented to the user when the event occurs, the event notification step being performed by a stimulus control unit that outputs stimulus removal data for providing control for removing the stimulus after the stimulus control unit receives notification data indicating that the event to be notified has occurred,
wherein
the event notification preparation step comprises presenting the stimulus to the user while gradually increasing the stimulus.

20. The event notification method according to claim 19, wherein
in the event notification preparation step, the stimulus is presented to the user while being increased gradually in an amount smaller than a difference threshold, which is a minimum stimulus difference noticeable by the user as change in stimulus.

21. The event notification method according to claim 19, wherein
in the event notification preparation step, an initial value of the stimulus is set to be smaller than a stimulus threshold, which is a minimum value that allows the stimulus to be sensed by the user.

22. The event notification method according to claim 19, wherein
in the event notification step, the presented stimulus is removed partially.

23. The event notification method according to claim 19, wherein in the event notification step, the presented stimulus is removed in such a manner that the amount of the stimulus to be removed is equal to or greater than a difference threshold, which is a minimum stimulus difference noticeable by the user as change in stimulus.

24. The event notification method according to claim 19, further comprising:
an event detection step of detecting occurrence of the event.

25. The event notification method according to claim 19, further comprising:
a timer management step of managing a time elapsed until the user adapts to the stimulus.

26. The event notification method according to claim 19, wherein
the stimulus is at least one selected from the group consisting of a pressure, vibration, and a sound, and
in the event notification preparation step, at least one of the pressure, an amplitude of the vibration, and a frequency of the sound is presented to the user.

27. The event notification method according to claim 19, further comprising:
a feedback step of detecting a stimulus in the event notification preparation step and the event notification step and feeding back a value of the thus-detected stimulus to the event notification preparation step and the event notification step.

28. The event notification method according to claim 19, further comprising:
a timing adjustment step of detecting a stimulus from outside of the device and adjusting a timing of starting the event notification preparation step.

29. The event notification method according to claim 19, wherein
the event is at least one event selected from the group consisting of: arrival of a preset time; a call; receipt of an e-mail; establishment of communication; interruption of the communication; completion of download; completion of upload; completion of transmission or reception of data; occurrence of an event and a response to an operation in a game; and occurrence of an event and a response to an operation in an application.

\* \* \* \* \*

UNITED STATES PATENT AND TRADEMARK OFFICE
CERTIFICATE OF CORRECTION

PATENT NO.       : 9,049,277 B2
APPLICATION NO.  : 13/382842
DATED            : June 2, 2015
INVENTOR(S)      : Shin Norieda It is certified that error appears in the above-identified patent and that said Letters Patent is hereby corrected as shown below:

In the specification

Column 11, Line 67: Delete "$\Delta I_L$" and insert -- $\Delta I_k$ --

Signed and Sealed this
Ninth Day of August, 2016

Michelle K. Lee
*Director of the United States Patent and Trademark Office*